(12) United States Patent
Shimada

(10) Patent No.: US 7,446,956 B2
(45) Date of Patent: Nov. 4, 2008

(54) ZOOM LENS SYSTEM, IMAGING APPARATUS AND METHOD FOR VARYING FOCAL LENGTH

(75) Inventor: Toshiyuki Shimada, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/761,936

(22) Filed: Jun. 12, 2007

(65) Prior Publication Data

US 2007/0285800 A1    Dec. 13, 2007

(30) Foreign Application Priority Data

Jun. 12, 2006    (JP)    ............... 2006-162522

(51) Int. Cl.
*G02B 9/12*    (2006.01)
(52) U.S. Cl. .............. 359/784; 359/770; 359/689; 359/680
(58) Field of Classification Search ................ 359/784, 359/770, 689, 680, 686, 781, 782, 758, 760
See application file for complete search history.

(56) References Cited

U.S. PATENT DOCUMENTS

| 6,646,815 | B2 | 11/2003 | Nobe |
| 6,829,102 | B2 | 12/2004 | Ohashi et al. |
| 6,836,375 | B1 | 12/2004 | Ito |
| 7,023,623 | B2 | 4/2006 | Miyatake et al. |
| 7,042,652 | B2 | 5/2006 | Nose et al. |
| 7,075,732 | B2 | 7/2006 | Watanabe et al. |
| 2002/0149857 | A1 | 10/2002 | Nobe |
| 2005/0068635 | A1 | 3/2005 | Arai |

FOREIGN PATENT DOCUMENTS

| JP | 2002-323654 A | 11/2002 |
| JP | 2003-005072 A | 1/2003 |
| JP | 2004-37700 A | 2/2004 |
| JP | 2005-099091 A | 4/2005 |
| JP | 2005-107274 A | 4/2005 |

*Primary Examiner*—Timothy J Thompson
(74) *Attorney, Agent, or Firm*—Miles & Stockbridge P.C.

(57) ABSTRACT

A zoom lens system having higher optical performance, a wide angle of view, a high zoom ratio, and compactness include, in order from an object, a first group having negative power, a second group having positive power, and a third group having positive power. At least the first and second lens groups are moved upon zooming. The first group has, in order from the object, a negative meniscus lens having a convex surface facing the object, and a positive lens. At least one surface of the negative meniscus lens is an aspherical surface. The second group has, in order from the object, a first positive lens, a second positive lens, a negative lens, and a third positive lens. At least one surface of the first positive lens is an aspherical surface. The third group has one positive lens, and at least one surface thereof is an aspherical surface.

25 Claims, 32 Drawing Sheets

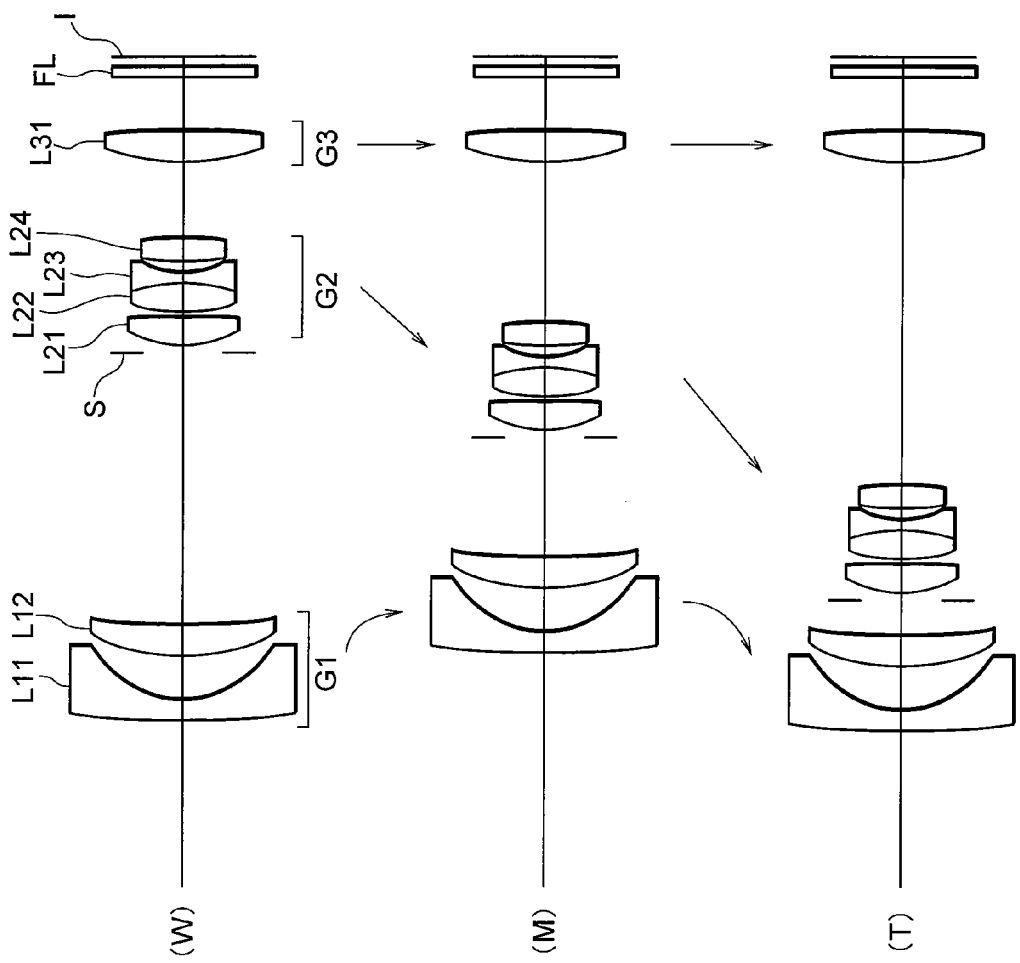

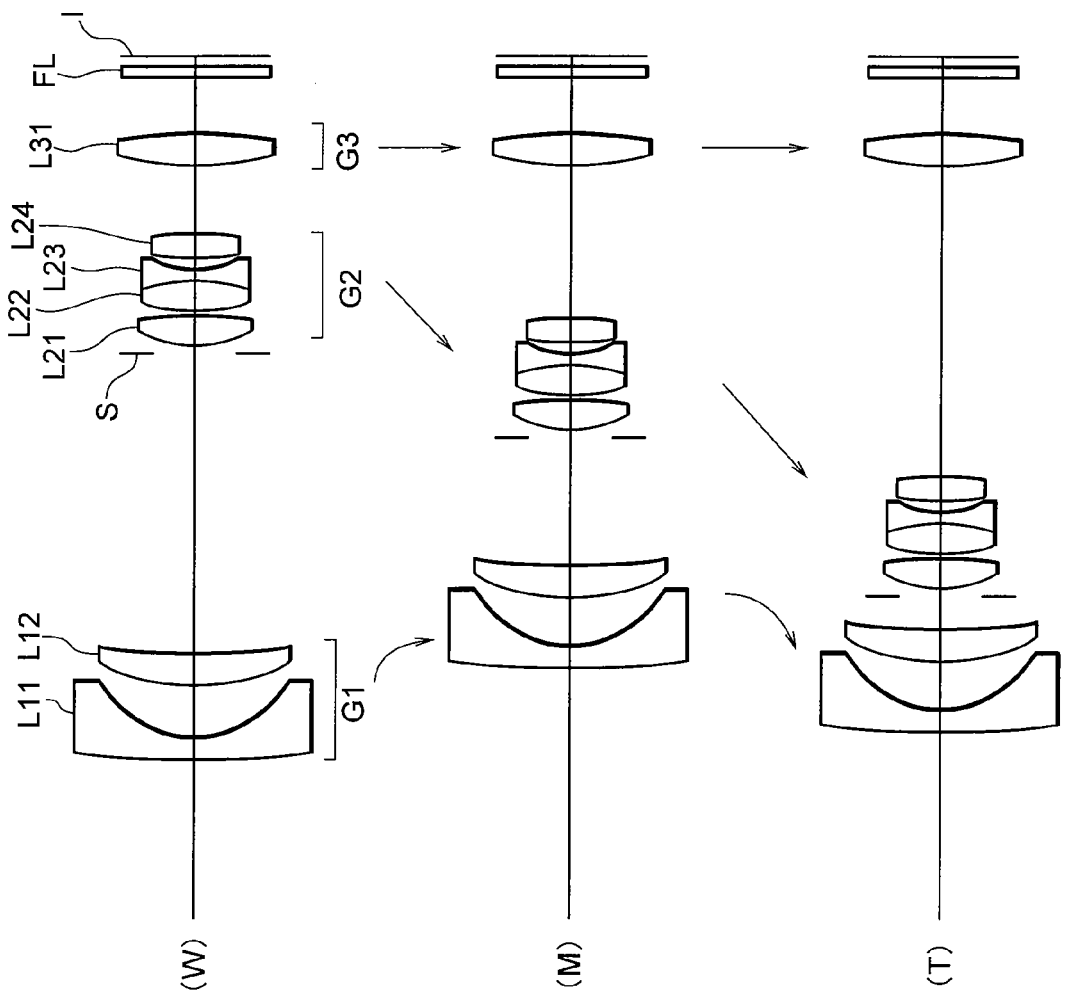

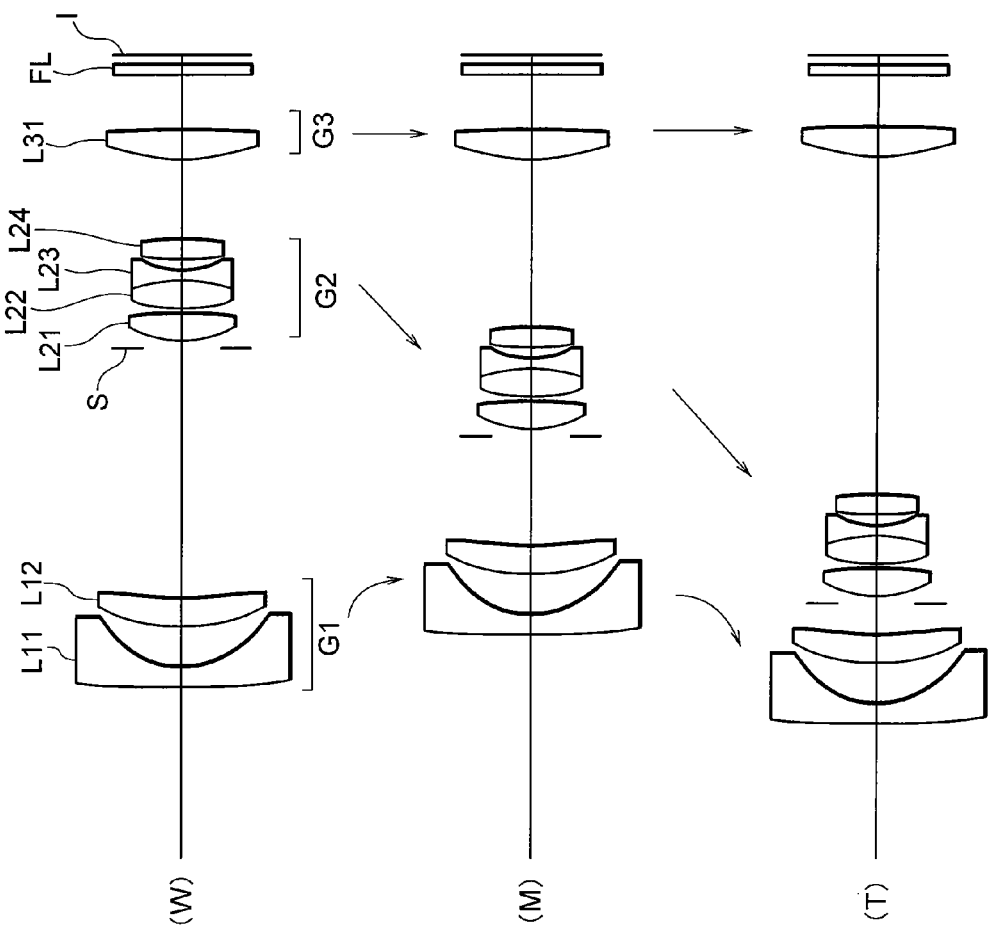

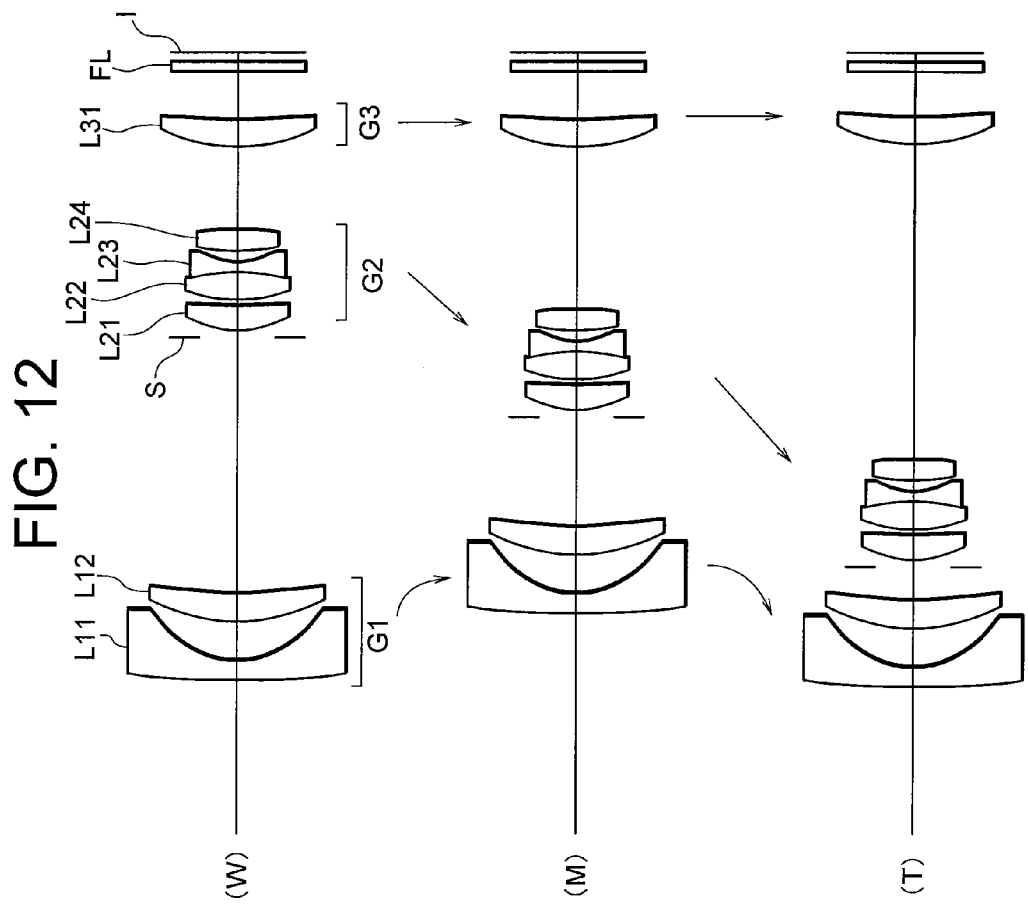

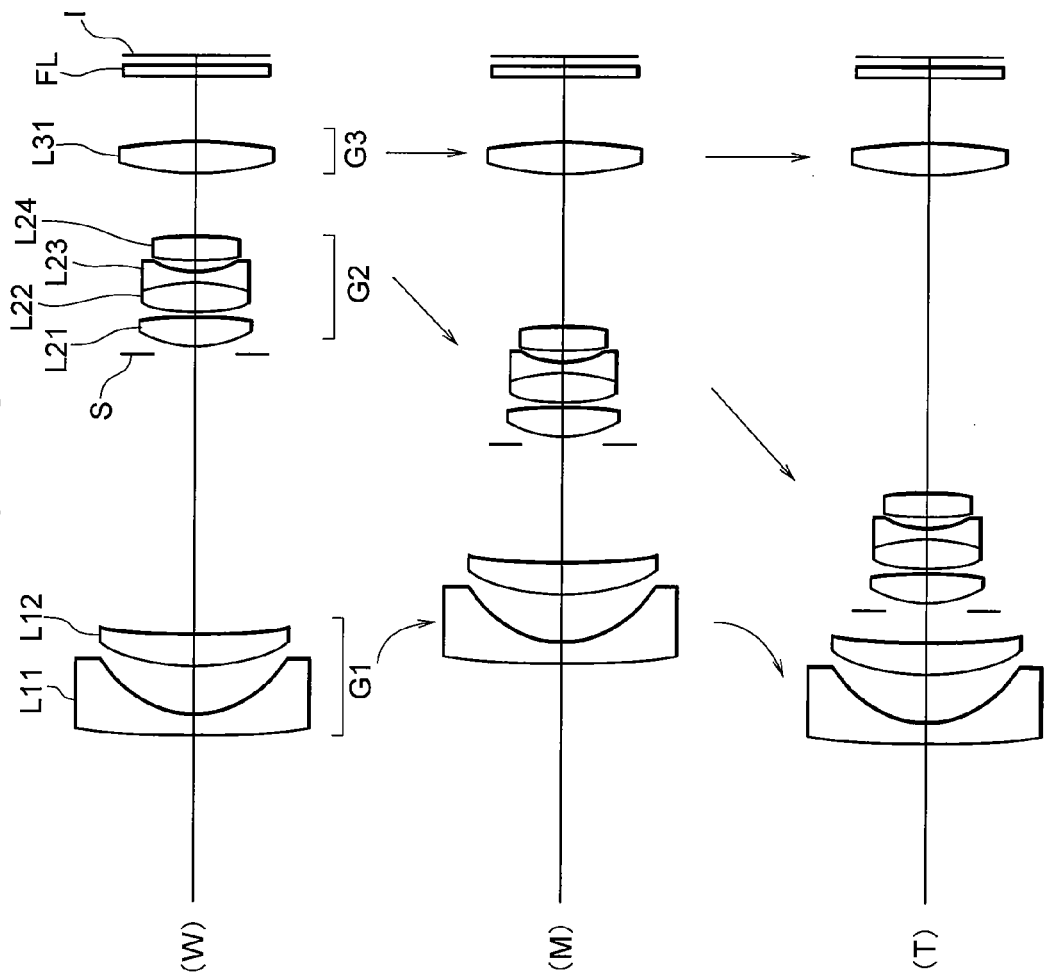

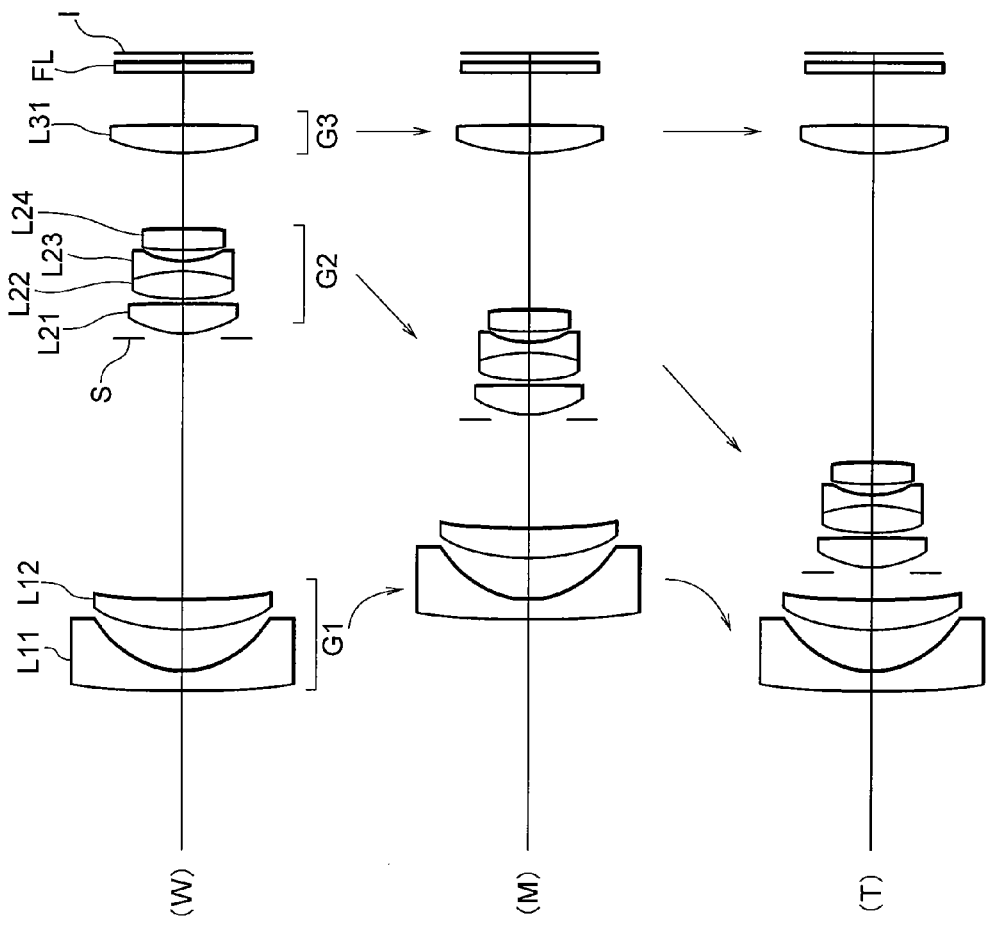

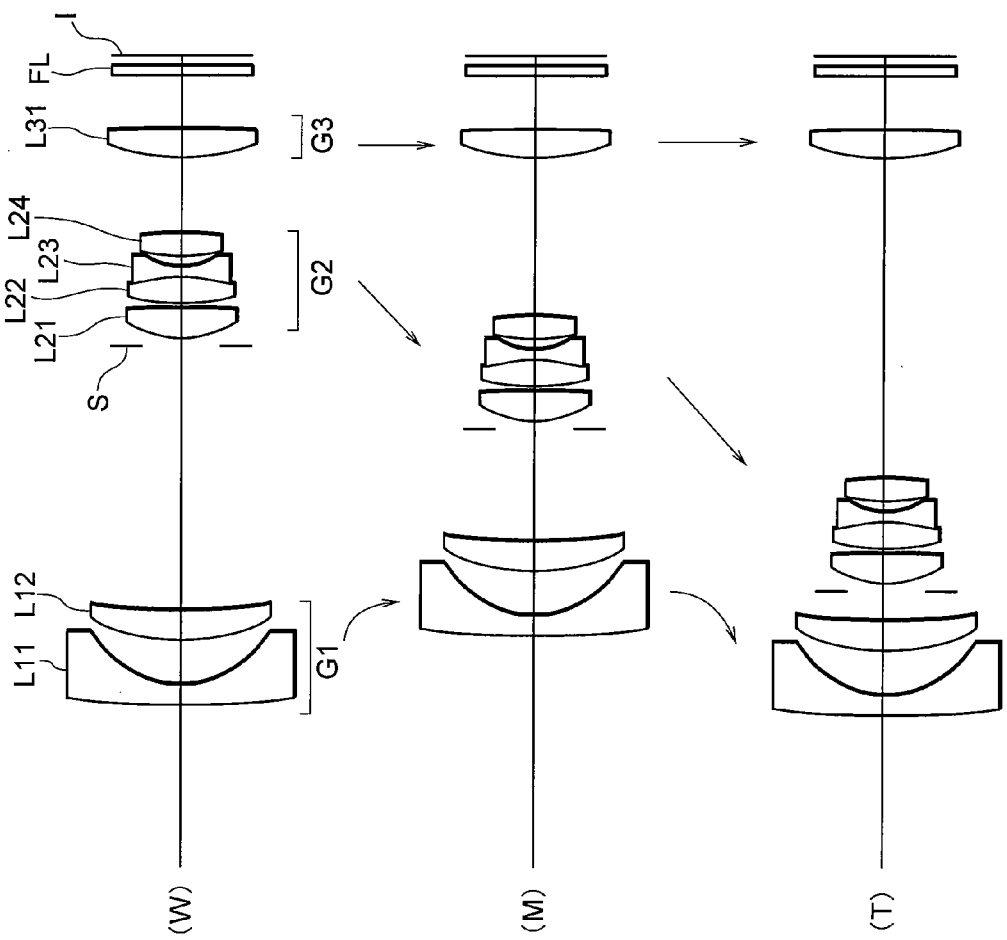

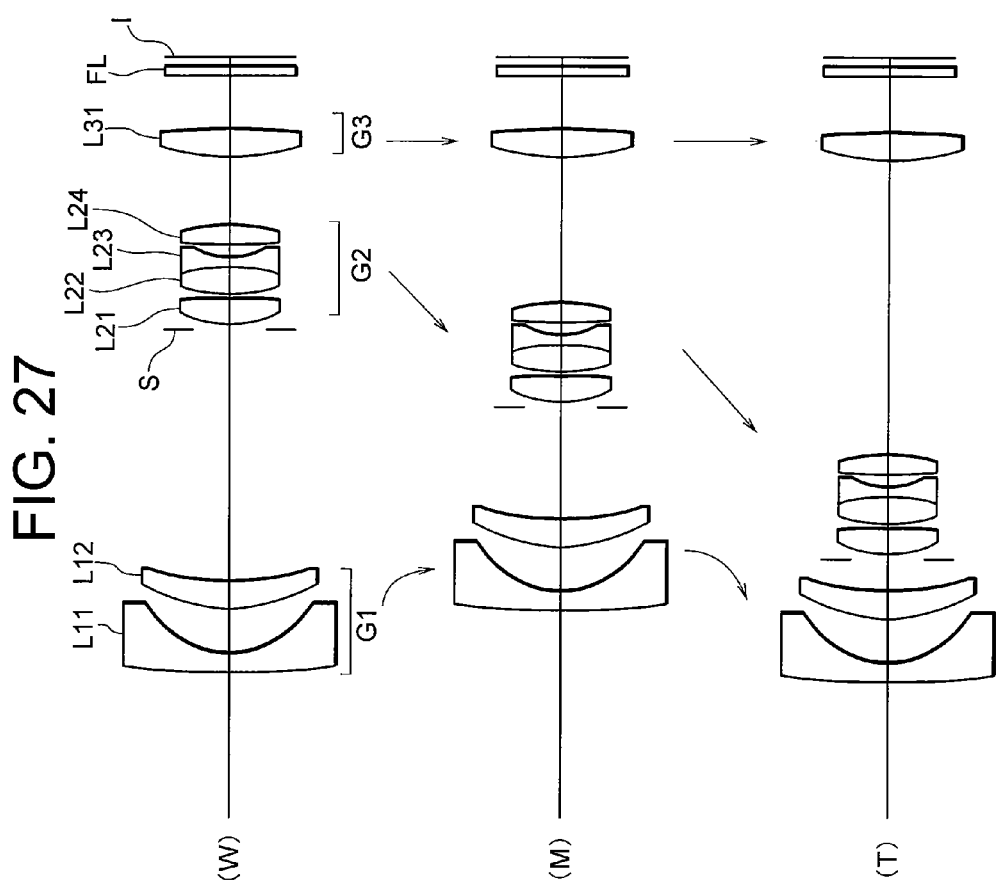

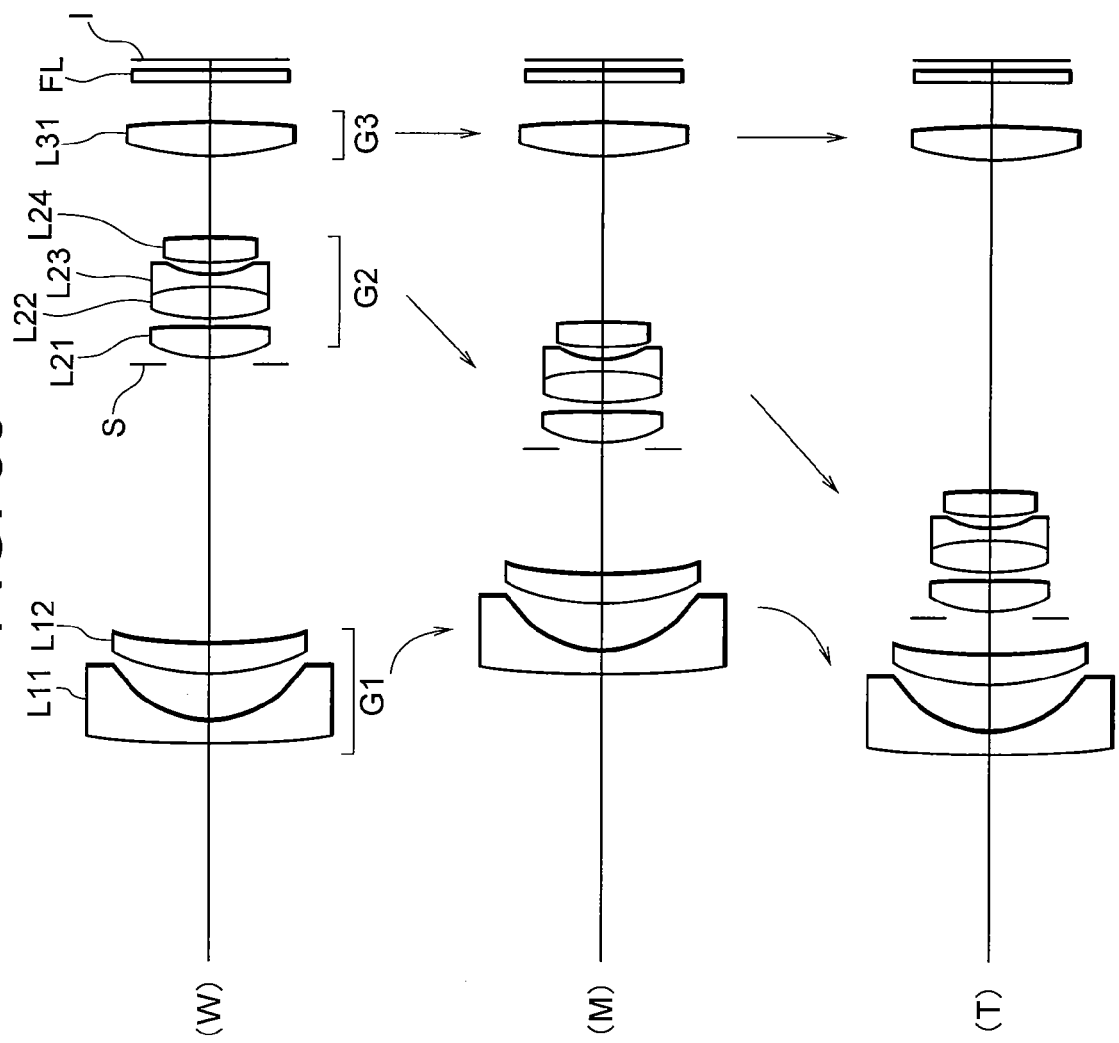

ZOOM LENS SYSTEM, IMAGING APPARATUS AND METHOD FOR VARYING FOCAL LENGTH

The disclosure of the following priority application is herein incorporated by reference:

Japanese Patent Application No. 2006-162522 filed on Jun. 12, 2006.

BACKGROUND OF THE INVENTION

1. Field of the Invention

The present invention relates to a zoom lens system suitable for an imaging apparatus using a solid-state imaging device, an imaging apparatus using the zoom lens system and a method for varying a focal length of the zoom lens system.

2. Related Background Art

Recently, an imaging device such as a digital still camera and a digital video camera using a solid-state imaging device has been increasingly getting sophisticated and compact. In such an imaging apparatus, a zoom lens system is generally used for an image-taking lens. Accordingly, with a zoom lens system, a photographer can easily take a picture with an optimum angle of view appropriate to a shooting condition.

Among these zoom lens systems, the majority of those loaded on a compact camera in particular have a zoom ratio of about three, and most of them are a negative-leading type zoom lens system in which a lens group having negative refractive power is disposed to the most object side and at least one lens group having positive refractive power is disposed to the image side thereof (for example, see Japanese Patent Application Laid-Open No 2004-037700).

The reason why a negative-leading type is popular is that despite of a simple configuration with two or three lens groups this type makes it possible to obtain a zoom ratio of about three and to permit preferable aberration correction. Moreover, this type makes it possible to move the position of the entrance pupil to the object side resulting in advantages that the diameter of the most object side lens group can be small and the position of the exit pupil can be kept sufficiently away from an imaging device.

Furthermore, since a negative-leading type zoom lens system has reversed-telephoto-type refractive power distribution on the whole, it is suitable for a wide angle of view in comparison with a positive-leading type zoom lens system. Accordingly, in order to provide a zoom lens system having an angle of view corresponding to a serious wide-angle shot and optical performance corresponding to an imaging apparatus increasingly sophisticated year after year, it is reasonable to introduce a negative-leading type zoom lens system. Then, power distribution of each lens group composing the zoom lens system, lens composition in each lens group, the position of an aspherical surface, and glass materials of each lens have to be properly selected so as to provide preferable aberration correction with respect to a wide angle of view.

However, a negative-leading type zoom lens system tends to become long in the total lens length in comparison with the focal length, so that when the zoom lens system is forcibly made compact, it becomes extremely difficult to correct aberrations. Moreover, when compactness and high optical performance of the zoom lens system are made compatible, variation in aberration upon focusing tends to become large, so that it becomes difficult to secure preferable optical performance over entire focusing range from infinity to a close-range object. Furthermore, the wider an angle of view in the wide-angle end state becomes, the larger the variation in aberration upon focusing becomes, so that it is a problem.

SUMMARY OF THE INVENTION

The present invention is made in view of the aforementioned problems and has an object to provide a zoom lens system having a wide angle of view, a high zoom ratio with realizing compactness and high optical performance, another object to provide an imaging apparatus using the zoom lens system, and still another object to provide a method for varying a focal length of the zoom lens system.

According to a first aspect of the present invention, there is provided a zoom lens system including, in order from an object along an optical axis, a first lens group having negative refractive power, a second lens group having positive refractive power, and a third lens group having positive refractive power. Upon zooming from a wide-angle end state to a telephoto end state, at least the first lens group and the second lens group being moved such that a distance between the first lens group and the second lens group decreases, and a distance between the second lens group and the third lens group increases. The first lens group consists of, in order from the object along the optical axis, a negative meniscus lens having a convex surface facing the object, and a positive lens. At least one surface of the negative meniscus lens is an aspherical surface. The second lens group consists of, in order from the object along the optical axis, a first positive lens, a second positive lens, a negative lens, and a third positive lens. At least one surface of the first positive lens is an aspherical surface. The third lens group consists of a single positive lens, and the following conditional expressions (1) and (2) are satisfied:

$$0.50 < ft \times Y\max / \{fw \times (fw + ft)\} < 0.70 \tag{1}$$

$$1.14 < |f1|/(fw \times ft)^{1/2} < 1.35 \tag{2}$$

where Ymax denotes the maximum image height of the zoom lens system, fw denotes a focal length of the zoom lens system in the wide-angle end state, ft denotes a focal length of the zoom lens system in the telephoto end state, and f1 denotes a focal length of the first lens group.

In the first aspect of the present invention, it is preferable that an aperture stop is disposed between the first lens group and the second lens group.

In the first aspect of the present invention, the following conditional expression (3) is preferably satisfied:

$$0.114 < fw/TL < 0.145 \tag{3}$$

where TL denotes the maximum total lens length.

In the first aspect of the present invention, it is preferable that focusing from infinity to a close-range object is carried out by moving the third lens group along the optical axis.

In the first aspect of the present invention, the following conditional expression (4) is preferably satisfied:

$$-0.20 < (Rb+Ra)/(Rb-Ra) < 1.50 \tag{4}$$

where Ra denotes a paraxial radius of curvature of the object side surface of the positive lens in the third lens group, and Rb denotes a paraxial radius of curvature of the image side surface of the positive lens in the third lens group.

In the first aspect of the present invention, the following conditional expression (5) is preferably satisfied:

$$80.0 < \nu 31 < 95.0 \tag{5}$$

where ν31 denotes Abbe number of a material of the positive lens in the third lens group at d-line, which has a wavelength λ=587.6 nm.

In the first aspect of the present invention, the following conditional expression (6) is preferably satisfied:

$$0.55 < fL11/f1 < 0.65 \quad (6)$$

where fL11 denotes a focal length of the negative meniscus lens in the first lens group, and f1 denotes a focal length of the first lens group.

In the first aspect of the present invention, the following conditional expressions (7) and (8) are preferably satisfied:

$$0.29 < n23 - n24 < 0.50 \quad (7)$$

$$25.0 < \nu23 \quad (8)$$

where n23 denotes refractive index of a material of the negative lens in the second lens group at d-line, which has a wavelength λ=587.6 nm, n24 denotes refractive index of a material of the third positive lens in the second lens group at d-line, and ν23 denotes Abbe number of a material of the negative lens in the second lens group at d-line.

In the first aspect of the present invention, it is preferable that the second positive lens and the negative lens in the second lens group are cemented with each other, and the following conditional expression (9) is preferably satisfied:

$$0.30 < Rc/Rd < 1.10 \quad (9)$$

where Rc denotes a paraxial radius of curvature of the object side surface of the first positive lens in the second lens group, and Rd denotes a paraxial radius of curvature of the object side surface of the second positive lens in the second lens group.

In the first aspect of the present invention, it is preferable that at least one surface of the positive lens in the first lens group is an aspherical surface.

In the first aspect of the present invention, it is preferable that at least one surface of the positive lens in the third lens group is an aspherical surface.

In the first aspect of the present invention, it is preferable that the object side surface of the positive lens in the third lens group is an aspherical surface, and the aspherical surface has a shape that positive refractive power becomes stronger in the periphery of the lens than in the area near the optical axis.

In the first aspect of the present invention, it is preferable that the third lens group is fixed upon zooming.

According to a second aspect of the present invention, there is provided an imaging apparatus equipped with a zoom lens according to the first aspect.

According to a third aspect of the present invention, there is provided a method for forming an image of an object and varying a focal length of a zoom lens system that includes, in order from the object along an optical axis, a first lens group having negative refractive power, a second lens group having positive refractive power, and a third lens group having positive refractive power. The method includes steps of: providing the first lens group that consists of, in order from the object along the optical axis, a negative meniscus lens having a convex surface facing the object, and a positive lens; forming an aspherical surface on at least one surface of the negative meniscus lens; providing the second lens group that consists of, in order from the object along the optical axis, a first positive lens, a second positive lens, a negative lens, and a third positive lens; forming an aspherical surface on at least one surface of the first positive lens; providing the third lens group that consists of a single positive lens; satisfying the following conditional expressions (1) and (2):

$$0.50 < ft \times Ymax / \{fw \times (fw+ft)\} < 0.70 \quad (1)$$

$$1.14 < ''f1'' / (fw \times ft)^{1/2} < 1.35 \quad (2)$$

where Ymax denotes the maximum image height of the zoom lens system, fw denotes a focal length of the zoom lens system in the wide-angle end state, ft denotes a focal length of the zoom lens system in the telephoto end state, and f1 denotes a focal length of the first lens group; and varying the focal length of the zoom lens system from the wide-angle end state to the telephoto end state by moving at least the first lens group and the second lens group such that a distance between the first lens group and the second lens group decreases, and a distance between the second lens group and the third lens group increases.

In the third aspect of the present invention, the method preferably includes a step of satisfying the following conditional expression (6):

$$0.55 < fL11/f1 < 0.65 \quad (6)$$

where fL11 denotes a focal length of the negative meniscus lens in the first lens group, and f1 denotes a focal length of the first lens group.

In the third aspect of the present invention, the method preferably includes a step of satisfying the following conditional expressions (7) and (8):

$$0.29 < n23 - n24 < 0.50 \quad (7)$$

$$25.0 < \nu23 \quad (8)$$

where n23 denotes refractive index of a material of the negative lens in the second lens group at d-line, which has a wavelength λ=587.6 nm, n24 denotes refractive index of a material of the third positive lens in the second lens group at d-line, and ν23 denotes Abbe number of a material of the negative lens in the second lens group at d-line.

Other features and advantages according to the present invention will be readily understood from the detailed description of the most preferred embodiments in conjunction with the accompanying drawings.

BRIEF DESCRIPTION OF THE DRAWINGS

FIGS. 1A and 1B are diagrams showing an electronic still camera which is equipped with a zoom lens system according to the present embodiment, in which FIG. 1A is a front view and FIG. 1B is a rear view.

FIG. 3 is a diagram showing a lens configuration of a zoom lens system according to Example 1 together with a zooming trajectory of each lens group.

FIGS. 4A, 4B and 4C are graphs showing various aberrations of the zoom lens system according to Example 1 upon focusing on infinity in which FIG. 4A is in a wide-angle end state, FIG. 4B is in an intermediate focal length state, and FIG. 4C is in a telephoto end state.

FIGS. 5A, 5B and 5C are graphs showing various aberrations of the zoom lens system according to Example 1 upon focusing on a close-rang object in which FIG. 5A is in a wide-angle end state, FIG. 5B is in an intermediate focal length state, and FIG. 5C is in a telephoto end state.

FIG. 6 is a diagram showing a lens configuration of a zoom lens system according to Example 2 together with a zooming trajectory of each lens group.

FIGS. 7A, 7B and 7C are graphs showing various aberrations of the zoom lens system according to Example 2 upon focusing on infinity in which FIG. 7A is in a wide-angle end state, FIG. 7B is in an intermediate focal length state, and FIG. 7C is in a telephoto end state.

FIGS. 8A, 8B and 8C are graphs showing various aberrations of the zoom lens system according to Example 2 upon focusing on a close-rang object in which FIG. 8A is in a wide-angle end state, FIG. 8B is in an intermediate focal length state, and FIG. 8C is in a telephoto end state.

FIG. 9 is a diagram showing a lens configuration of a zoom lens system according to Example 3 together with a zooming trajectory of each lens group.

FIGS. 10A, 10B and 10C are graphs showing various aberrations of the zoom lens system according to Example 3 upon focusing on infinity in which FIG. 10A is in a wide-angle end state, FIG. 10B is in an intermediate focal length state, and FIG. 10C is in a telephoto end state.

FIGS. 11A, 11B and 11C are graphs showing various aberrations of the zoom lens system according to Example 3 upon focusing on a close-rang object in which FIG. 11A is in a wide-angle end state, FIG. 11B is in an intermediate focal length state, and FIG. 11C is in a telephoto end state.

FIG. 12 is a diagram showing a lens configuration of a zoom lens system according to Example 4 together with a zooming trajectory of each lens group.

FIGS. 13A, 13B and 13C are graphs showing various aberrations of the zoom lens system according to Example 4 upon focusing on infinity in which FIG. 13A is in a wide-angle end state, FIG. 13B is in an intermediate focal length state, and FIG. 13C is in a telephoto end state.

FIGS. 14A, 14B and 14C are graphs showing various aberrations of the zoom lens system according to Example 4 upon focusing on a close-rang object in which FIG. 14A is in a wide-angle end state, FIG. 14B is in an intermediate focal length state, and FIG. 14C is in a telephoto end state.

FIG. 15 is a diagram showing a lens configuration of a zoom lens system according to Example 5 together with a zooming trajectory of each lens group.

FIGS. 16A, 16B and 16C are graphs showing various aberrations of the zoom lens system according to Example 5 upon focusing on infinity in which FIG. 16A is in a wide-angle end state, FIG. 16B is in an intermediate focal length state, and FIG. 16C is in a telephoto end state.

FIGS. 17A, 17B and 17C are graphs showing various aberrations of the zoom lens system according to Example 5 upon focusing on a close-rang object in which FIG. 17A is in a wide-angle end state, FIG. 17B is in an intermediate focal length state, and FIG. 17C is in a telephoto end state.

FIGS. 19A, 19B and 19C are graphs showing various aberrations of the zoom lens system according to Example 6 upon focusing on infinity in which FIG. 19A is in a wide-angle end state, FIG. 19B is in an intermediate focal length state, and FIG. 19C is in a telephoto end state.

FIGS. 20A, 20B and 20C are graphs showing various aberrations of the zoom lens system according to Example 6 upon focusing on a close-rang object in which FIG. 20A is in a wide-angle end state, FIG. 20B is in an intermediate focal length state, and FIG. 20C is in a telephoto end state.

FIG. 21 is a diagram showing a lens configuration of a zoom lens system according to Example 7 together with a zooming trajectory of each lens group.

FIGS. 22A, 22B and 22C are graphs showing various aberrations of the zoom lens system according to Example 7 upon focusing on infinity in which FIG. 22A is in a wide-angle end state, FIG. 22B is in an intermediate focal length state, and FIG. 22C is in a telephoto end state.

FIGS. 23A, 23B and 23C are graphs showing various aberrations of the zoom lens system according to Example 7 upon focusing on a close-rang object in which FIG. 23A is in a wide-angle end state, FIG. 23B is in an intermediate focal length state, and FIG. 23C is in a telephoto end state.

FIG. 24 is a diagram showing a lens configuration of a zoom lens system according to Example 8 together with a zooming trajectory of each lens group.

FIGS. 25A, 25B and 25C are graphs showing various aberrations of the zoom lens system according to Example 8 upon focusing on infinity in which FIG. 25A is in a wide-angle end state, FIG. 25B is in an intermediate focal length state, and FIG. 25C is in a telephoto end state.

FIGS. 26A, 26B and 26C are graphs showing various aberrations of the zoom lens system according to Example 8 upon focusing on a close-rang object in which FIG. 26A is in a wide-angle end state, FIG. 26B is in an intermediate focal length state, and FIG. 26C is in a telephoto end state.

FIG. 27 is a diagram showing a lens configuration of a zoom lens system according to Example 9 together with a zooming trajectory of each lens group.

FIGS. 28A, 28B and 28C are graphs showing various aberrations of the zoom lens system according to Example 9 upon focusing on infinity in which FIG. 28A is in a wide-angle end state, FIG. 28B is in an intermediate focal length state, and FIG. 28C is in a telephoto end state.

FIGS. 29A, 29B and 29C are graphs showing various aberrations of the zoom lens system according to Example 9 upon focusing on a close-rang object in which FIG. 29A is in a wide-angle end state, FIG. 29B is in an intermediate focal length state, and FIG. 29C is in a telephoto end state.

FIG. 30 is a diagram showing a lens configuration of a zoom lens system according to Example 10 together with a zooming trajectory of each lens group.

FIGS. 31A, 31B and 31C are graphs showing various aberrations of the zoom lens system according to Example 10 upon focusing on infinity in which FIG. 31A is in a wide-angle end state, FIG. 31B is in an intermediate focal length state, and FIG. 31C is in a telephoto end state.

FIGS. 32A, 32B and 32C are graphs showing various aberrations of the zoom lens system according to Example 10 upon focusing on a close-rang object in which FIG. 32A is in a wide-angle end state, FIG. 32B is in an intermediate focal length state, and FIG. 32C is in a telephoto end state.

DESCRIPTION OF THE MOST PREFERRED EMBODIMENT

A zoom lens system according to an embodiment of the present application is explained below.

Figure 1A:
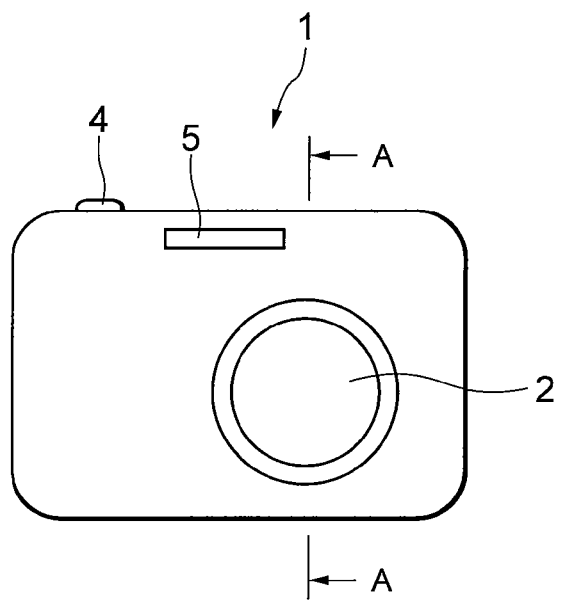
Figure 1B:
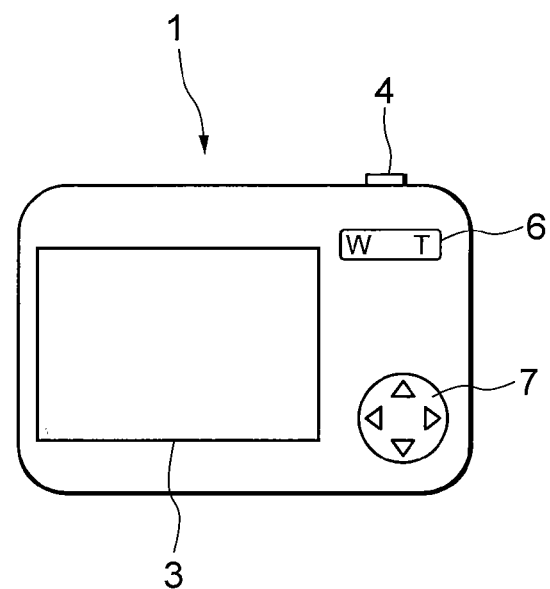
Figure 2:
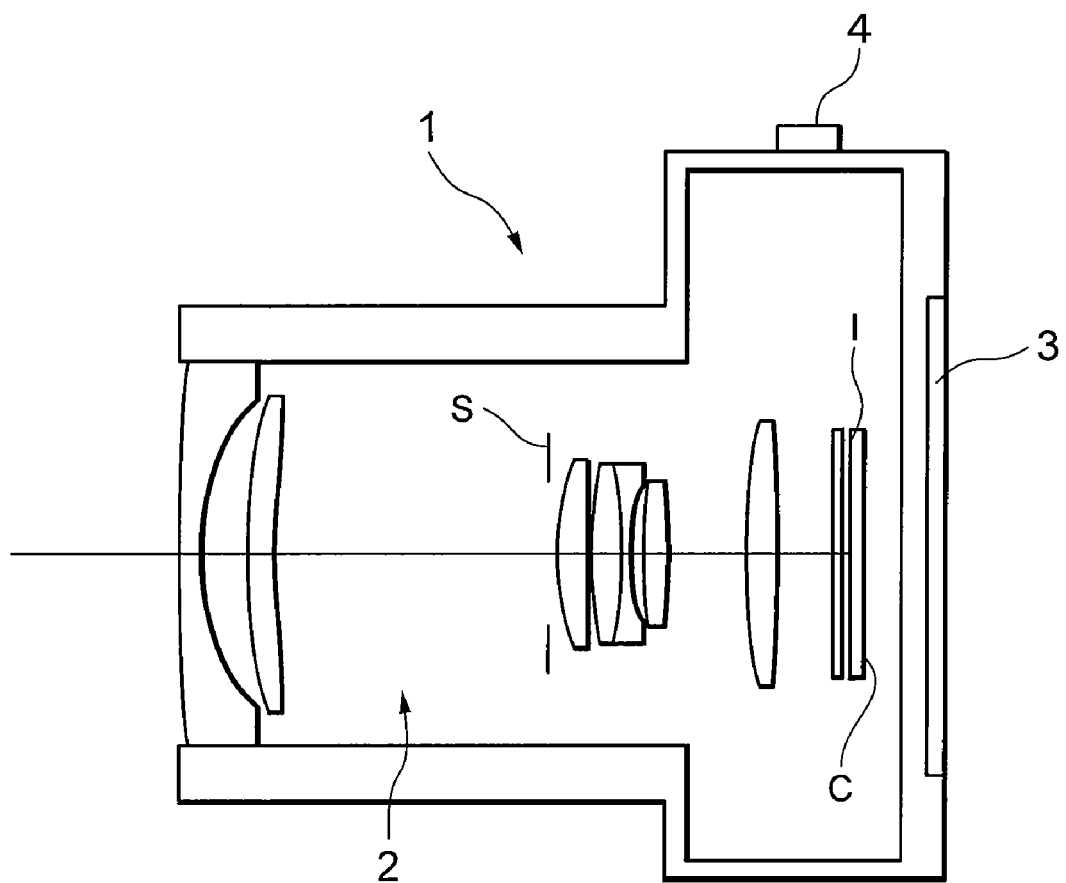
FIG. 2 is a cross-sectional view along the A-A line in FIG. 1A.

FIGS. 1A and 1B are diagrams showing an electronic still camera equipped with a zoom lens system according to an embodiments, which is explained later, in which FIG. 1A is a front view and FIG. 1B is a rear view. FIG. 2 is a cross-sectional view along the A-A line in FIG. 1A.

In an electronic still camera 1 according to the present embodiment shown in FIGS. 1A, 1B and 2, when a power switch button (not shown) is pressed, a shutter (not shown) is opened and light from a subject (not shown) is collected by an image-taking lens 2 and an image is formed on an imaging device C (such as CCD, CMOS, and the like) disposed on an image plane I. The subject image formed on the imaging device C is displayed on a liquid crystal monitor 3 disposed backside of the electronic still camera 1. After fixing the composition of the subject image with observing the liquid crystal monitor 3, a photographer depresses a release button 4 to take a picture of the subject image by the imaging device C, and stores in a memory (not shown).

The image-taking lens 2 is composed of a zoom lens system 2 according to the present embodiment explained later. Moreover, in the electronic still camera 1, there are disposed such as an auxiliary light emitter 5 that emits auxiliary light when the subject is dark, a W-T button 6 that makes the zoom lens system 2, which is the image-taking lens 2, zoom from a wide-angle end state (W) to a telephoto end state (T), and an action button 7 that is used for setting various conditions of the electronic still camera 1.

In this manner, the electronic still camera 1 equipped with the zoom lens system 2 according to the present embodiment explained later is composed.

Then basic construction of a zoom lens system according to the present embodiment is explained below.

A zoom lens system according to the present embodiment includes, in order from an object, a first lens group having negative refractive power, an aperture stop, a second lens group having positive refractive power, and a third lens group having positive refractive power. Upon zooming from a wide-angle end state to a telephoto end state, at least the first lens group and the second lens group are moved such that a distance between the first lens group and the second lens group decreases, and a distance between the second lens group and the third lens group increases. The first lens group consists of, in order from the object along the optical axis, a negative meniscus lens having a convex surface facing the object, and a positive lens. At least one surface of the negative meniscus lens is an aspherical surface. The second lens group consists of, in order from the object along the optical axis, a first positive lens, a second positive lens, a negative lens, and a third positive lens. At least one surface of the first positive lens is an aspherical surface. The third lens group consists of a single positive lens. At least one surface of the third lens group is an aspherical surface.

Configuration and an effect of each lens group are explained below.

The first lens group forms a virtual image of the object and corrects variation in a focus position of the zoom lens system by being moved nonlinearly upon zooming. The second lens group is moved monotonously and changes magnification with respect to the virtual image formed by the first lens group. The third lens group is fixed or moved upon zooming, moves the position of the exit pupil of the zoom lens system to make the light effectively incident on the imaging device, and corrects residual aberrations left uncorrected by the first and second lens groups.

The first lens group preferably consists of two lenses, which are, in order from the object along the optical axis, a negative meniscus lens having a convex surface facing the object and a positive lens. By composing the first lens group with two lenses, it becomes possible to reduce thickness of the first lens group. Moreover, by disposing the two lenses, in order from the object, negative refractive power and positive refractive power, it becomes possible to correct lower coma and distortion in the wide-angle end state and spherical aberration in the telephoto end state.

It is preferable that at least one lens surface of the negative meniscus lens in the first lens group is an aspherical surface. By applying an aspherical surface, not only distortion in the wide-angle end state can be corrected well, but also refractive power of the first lens group can be stronger, so that it is advantageous to make the zoom lens system compact. In order to secure the effect of the present invention, it is preferable that the image side surface of the negative meniscus lens is an aspherical surface. The positive lens in the first lens group preferably has a meniscus shape having a convex surface facing the object. By making the positive lens in such shape, it becomes possible to preferably correct lower coma and distortion in the wide-angle end state and spherical aberration in the telephoto end state.

Configuration of the second lens group is explained below. A negative-leading type zoom lens system has reversed-telephoto-type refractive power distribution on the whole. Similar to the case of a single focal length lens system, such refractive power distribution tends to generate negative distortion and lateral chromatic aberration. Accordingly, in the second lens group, it is necessary to apply a lens type that has high degrees of freedom with respect to such aberrations.

A lens type satisfying the condition with the simplest configuration is a triplet type composed of three lenses, which have positive, negative and positive refractive power, respectively. In the triplet type, distortion and lateral chromatic aberration can be controlled relatively freely by properly selecting refractive index and dispersion of each lens.

However, when the second lens group constructed by a triplet type is disposed to the rear side of the first lens group having negative refractive power just like the present zoom lens system, since a bundle of rays diverged by the first lens group is incident on the second lens group, it tends to become difficult to correct spherical aberration. In order to enhance the ability to correct negative distortion generated in the first lens group, the second lens group is necessary to have telephoto-type refractive power distribution. In this case, strong refractive power concentrates upon the positive lens disposed to the most object side of the triplet type, so that it becomes further disadvantageous to correct spherical aberration. In order to preferably correct spherical aberration with constructing the second lens group by the triplet type, refractive power of the second lens group has to be weak, so that the zoom lens system inevitably becomes large. Accordingly, when the second lens group is constructed by a triplet type, the zoom lens system becomes difficult to satisfy both compactness and high optical performance simultaneously.

In the present zoom lens system, in order to enhance ability of the second lens group to correct spherical aberration, the positive lens disposed to the most object side is divided into two lenses, and the second lens group preferably consists of, in order from the object along the optical axis, a first positive lens, a second positive lens, a negative lens, and a third positive lens. With this configuration, it becomes possible to enhance ability to correct distortion and lateral chromatic aberration and increase refractive power of the second lens group on the whole, so that the zoom lens system can be compact.

Moreover, it is preferable that at least one surface of the first positive lens in the second lens group is an aspherical surface. With using an aspherical surface, not only spherical aberration generated in the second lens group can be corrected more preferably, but also refractive power of the second lens group on the whole can be strong, so that it is effective to make the zoom lens system compact. In order to further secure the effect of the present invention, the object side surface of the first positive lens is preferably an aspherical surface. Furthermore, with making both surfaces of the first positive lens be aspherical, it becomes possible to further enhance ability to correct spherical aberration and coma.

The third lens group preferably consists of a single positive lens. With composing the third lens group by a single positive lens, the thickness upon retracting can be reduced. Moreover, at least one lens surface included in the third lens group is preferably an aspherical surface. With using an aspherical surface in the third lens group, residual astigmatism left uncorrected by the first and second lens groups can effectively be corrected.

Moreover, the present zoom lens system preferably satisfies the following conditional expressions (1) to (3):

$$0.50 < ft \times Ymax/\{fw \times (fw+ft)\} < 0.70 \quad (1)$$

$$1.14 < |f1|/(fw \times ft)^{1/2} < 1.35 \quad (2)$$

$$0.114 < fw/TL < 0.145 \quad (3)$$

where Ymax denotes the maximum image height of the zoom lens system, fw denotes a focal length of the zoom lens system in the wide-angle end state, ft denote a focal length of the zoom lens system in the telephoto end state, TL denotes the maximum total lens length of the zoom lens system, and f1 denotes a focal length of the first lens group.

Conditional expression (1) defines an appropriate range of the focal length of the zoom lens system in the wide-angle end state, the focal length of the zoom lens system in the telephoto end state, and the maximum image height. When the value ft×Ymax/{fw×(fw+ft)} is equal to or falls below the lower limit of conditional expression (1), it becomes impossible to secure a sufficient angle of view in the wide-angle end state, or it becomes difficult to secure a sufficient zoom ratio. Accordingly, it is against the purpose of the present invention to provide a zoom lens system having a wide angle of view and high optical performance, so that it is undesirable. On the other hand, when the value ft×Ymax/{fw×(fw+ft)} is equal to or exceeds the upper limit of conditional expression (1), not only an angle of view in the wide-angle end state becomes excessively large, so that it becomes difficult to correct distortion, but also the focal length in the telephoto end state becomes too long, so that it becomes difficult to correct spherical aberration. As a result, it becomes difficult to secure preferable optical performance, so that it is undesirable.

In order to secure the effect of the present invention, it is preferable to set the lower limit of conditional expression (1) to 0.54. In order to further secure the effect of the present invention, it is more preferable to set the lower limit of conditional expression (1) to 0.56. In order to secure the effect of the present invention, it is preferable to set the upper limit of conditional expression (1) to 0.65. In order to further secure the effect of the present invention, it is more preferable to set the upper limit of conditional expression (1) to 0.62.

Conditional expression (2) defines an appropriate range of the focal length of the first lens group, the focal length of the zoom lens system in the wide-angle end state, and the focal length of the zoom lens system in the telephoto end state. When the value $|f1|/(fw \times ft)^{1/2}$ is equal to or falls below the lower limit of conditional expression (2), the total lens length of the zoom lens system in the telephoto end state becomes excessively long. Moreover, it becomes difficult to correct lower coma and distortion in the wide-angle end state and spherical aberration and lower coma in the telephoto end state, so that it is undesirable. On the other hand, when the value $|f1|/(fw \times ft)^{1/2}$ is equal to or exceeds the upper limit of conditional expression (2), the total lens length of the zoom lens system in the wide-angle end state becomes excessively long, and the outer diameter of the negative meniscus lens disposed to the most object side of the first lens group becomes large. In order to make the outer diameter of the negative meniscus lens small, refractive power of each lens composing the first lens group has to make excessively strong. However, with such measures, it becomes difficult correct lower coma in the wide-angle end state and spherical aberration in the telephoto end state, so that it is undesirable.

In order to secure the effect of the present invention, it is preferable to set the lower limit of conditional expression (2) to 1.18. In order to further secure the effect of the present invention, it is more preferable to set the lower limit of conditional expression (2) to 1.20. In order to secure the effect of the present invention, it is preferable to set the upper limit of conditional expression (2) to 1.35. In order to further secure the effect of the present invention, it is more preferable to set the upper limit of conditional expression (2) to 1.30.

Conditional expression (3) defines an appropriate range of a ratio of a focal length of the zoom lens system in the wide-angle end state to the maximum total lens length of the zoom lens system. When the ratio fw/TL is equal to or falls below the lower limit of conditional expression (3), the maximum total lens length of the zoom lens system becomes excessively long, and it is against the purpose of the present invention to make the zoom lens system compact, so that it is undesirable. Moreover, it becomes difficult to correct lateral chromatic aberration in the telephoto end state. On the other hand, when the ratio fw/TL is equal to or exceeds the upper limit of conditional expression (3) refractive power of each lens group becomes excessively strong. Accordingly, it becomes difficult to preferably correct spherical aberration, so that it is undesirable.

In order to secure the effect of the present invention, it is preferable to set the lower limit of conditional expression (3) to 0.117. In order to further secure the effect of the present invention, it is more preferable to set the lower limit of conditional expression (3) to 0.120. In order to secure the effect of the present invention, it is preferable to set the upper limit of conditional expression (3) to 0.135. In order to further secure the effect of the present invention, it is more preferable to set the upper limit of conditional expression (3) to 0.130.

In the present zoom lens system, it is preferable that focusing from infinity to a close-rang object is carried out by independently moving the third lens group along the optical axis. By using the third lens group for focusing, it becomes possible to take a picture of a close-rang object in the wide-angle end state without reducing peripheral quantity of light. In a negative-leading type zoom lens system, although it is possible to carry out focusing by moving the first lens group having negative refractive power, there is a problem that peripheral quantity of light conspicuously reduces upon taking a picture of a close-rang object in the wide-angle end state. In order to prevent this, the outer diameter of the first lens group becomes necessary to be increased. However, it becomes difficult to correct lower coma in the wide-angle end state, so that it is undesirable.

In the present zoom lens system, the following conditional expression (4) is preferably satisfied:

$$-0.20 < (Rb+Ra)/(Rb-Ra) < 1.50 \quad (4)$$

where Ra denotes a paraxial radius of curvature of the object side surface of the positive lens in the third lens group, and Rb denotes a paraxial radius of curvature of the image side surface of the positive lens in the third lens group.

Conditional expression (4) defines an appropriate range of a shape of the positive lens in the third lens group. In a negative-leading type zoom lens system covering the wide-angle range such as the present embodiment, it generally becomes difficult in the wide-angle end state to correct distortion and astigmatism at the same time in the first lens group. Accordingly, the first lens group mainly corrects negative distortion, and the residual astigmatism is necessary to be corrected by the third lens group. However, when the shape of the third lens group is not appropriate, negative distortion generated by the positive lens increases to become difficult to be corrected.

Upon using the aforementioned third lens group for focusing, since the height of principal ray passing through the positive lens in the third lens group varies and when the shape of the positive lens is inappropriate, variation in aberration upon focusing tends to happen. As described above, the is shape of the positive lens in the third lens group has an ability to preferably correct distortion and astigmatism in the wide-angle end state, and there is a certain range of the shape that gives minimum variation in aberrations upon focusing.

When the ratio (Rb+Ra)/(Rb−Ra) is equal to or falls below the lower limit of conditional expression (4), the image plane excessively moves in the positive direction in the entire focal length range upon focusing on a close-rang object and astigmatism increases, so that it is undesirable. On the other hand, when the ratio (Rb+Ra)/(Rb−Ra) is equal to or exceeds the upper limit of conditional expression (4), negative distortion generated by the positive lens in the third lens group increases in the wide-angle end state, and when such aberration is tried to be corrected by the first lens group, it becomes difficult to correct lower coma in the wide-angle end state, so that it is undesirable. In addition, the image side surface of the positive lens in the third lens group becomes a cause of ghost images, so that it is undesirable.

In order to secure the effect of the present invention, it is preferable to set the lower limit of conditional expression (4) to 0.00. In order to secure the effect of the present invention, it is preferable to set the upper limit of conditional expression (4) to 1.00.

In the present zoom lens system, it is preferable to satisfy the following conditional expression (5):

$$80.0 < v31 < 95.0 \qquad (5)$$

where $v31$ denotes Abbe number of the material of the positive lens in the third lens group at d-line (wavelength λ=587.6 nm).

Conditional expression (5) defines an appropriate range of Abbe number of the positive lens in the third lens group. As described above, when the third lens group is used for focusing, the height of the principal ray varies with respect to the focusing distance. Accordingly, when Abbe number of the positive lens in the third lens group is inappropriate, variation in lateral chromatic aberration tends to be generated upon focusing. When Abbe number $v31$ is equal to or falls below the lower limit of conditional expression (5), it becomes difficult to correct lateral chromatic aberration in the telephoto end state. Variation in lateral chromatic aberration increases upon focusing on a close-rang object, so that it is undesirable. On the other hand, when Abbe number $v31$ is equal to or exceeds the upper limit of conditional expression (5), lateral chromatic aberration is over corrected in the telephoto end state, so that it is undesirable. When an existing optical material is used, it becomes necessary to use fluorite for the positive lens in the third lens group. However, to form an aspherical surface on fluorite is a troublesome job, so that it is undesirable.

In the present zoom lens system, it is preferable to satisfy the following conditional expression (6):

$$0.55 < fL11/f1 < 0.65 \qquad (6)$$

where fL11 denotes a focal length of the negative meniscus lens in the first lens group, and f1 denotes a focal length of the first lens group.

Conditional expression (6) defines an appropriate range of the focal length of the first lens group and the focal length of the negative meniscus lens in the first lens group. When the ratio fL11/f1 is equal to or falls below the lower limit of conditional expression (6), it becomes difficult to correct lower coma in the wide-angle end state, so that it is undesirable. On the other hand, when the ratio fL11/f1 is equal to or exceeds the upper limit of conditional expression (6), since an axial distance between the negative lens and the positive lens in the first lens group becomes large, the thickness of the first lens group increases, and it is against the purpose of the present invention to make the zoom lens system compact, so that it is undesirable. In addition, it becomes difficult to correct astigmatism in the wide-angle end state, so that it is undesirable.

In order to secure the effect of the present invention, it is preferable to set the lower limit of conditional expression (6) to 0.56. In order to secure the effect of the present invention, it is preferable to set the upper limit of conditional expression (6) to 0.63.

In the present zoom lens system, it is preferable to satisfy the following conditional expressions (7) and (8):

$$0.29 < n23 - n24 < 0.50 \qquad (7)$$

$$25.0 < v23 \qquad (8)$$

where n23 denotes refractive index of the material of the negative lens in the second lens group at d-line (wavelength λ=587.6), n24 denote refractive index of the material of the third positive lens in the second lens group at d-line, and $v23$ denotes Abbe number of the material of the negative lens in the second lens group at d-line.

Conditional expression (7) defines an appropriate range of difference in refractive indices between the negative lens and the third positive lens in the second lens group. When the value n23−n24 is equal to or falls below the lower limit of conditional expression (7), it becomes difficult to correct astigmatism in the wide-angle end state, so that it is undesirable. On the other hand, when the value n23−n24 is equal to or exceeds the upper limit of conditional expression (7), Petzval sum becomes excessively positive, and it becomes difficult to correct astigmatism and curvature of field simultaneously in the telephoto end state, so that it is undesirable.

In order to secure the effect of the present invention, it is preferable to set the lower limit of conditional expression (7) to 0.33. In order to further secure the effect of the present invention, it is more preferable to set the lower limit of conditional expression (7) to 0.35.

Conditional expression (8) defines an appropriate range of Abbe number of the negative lens in the second lens group. When the value $v23$ is equal to or falls below the lower limit of conditional expression (8), since partial dispersion of the negative lens becomes large, secondary longitudinal chromatic aberration in the telephoto end state becomes large. Accordingly, superb optical performance cannot be achieved, so that it is undesirable.

In order to secure the effect of the present invention, it is preferable to set the lower limit of conditional expression (8) to 27.0.

In the present zoom lens system, it is preferable that the second positive lens and the negative lens in the second lens group are cemented with each other.

With cementing the second positive lens and the negative lens in the second lens group, error sensitivity with respect to the decentering of these lenses can greatly reduced.

In the present zoom lens system, it is preferable to satisfy the following conditional expression (9).

$$0.30 < Rc/Rd < 1.10 \qquad (9)$$

where Rc denotes a paraxial radius of curvature of the object side surface of the first positive lens in the second lens group, and Rd denotes a paraxial radius of curvature of the object side surface of the second positive lens in the second lens group.

Conditional expression (9) defines an appropriate range of the shapes of the first positive lens and the second positive lens in the second lens group. When the ratio Rc/Rd is equal to or falls below the lower limit of conditional expression (9), it becomes difficult to correct distortion in the wide-angle end state, and when such distortion is tried to be corrected by the third lens group, astigmatism in the telephoto end state upon focusing on a close-rang object becomes large, so that it is undesirable. On the other hand, when the ratio Rc/Rd is equal to or exceeds the upper limit of conditional expression (9), spherical aberration in the wide-angle end state and in the intermediate focal length state becomes under correction, and difference in upper coma with respect to the wavelength becomes large. Moreover, the lens thickness tolerances of the second positive lens and that of the negative lens in the second lens group become severe. In order to mitigate the tolerances, each of the thickness of the second positive lens and the negative lens in the second lens group has to be thick. Accordingly, the total thickness of the second lens group becomes large, so that it is undesirable.

In order to secure the effect of the present invention, it is preferable to set the lower limit of conditional expression (9) to 0.35. In order to further secure the effect of the present invention, it is more preferable to set the lower limit of conditional expression (9) to 0.40. In order to secure the effect of the present invention, it is preferable to set the upper limit of conditional expression (9) to 0.80. In order to further secure the effect of the present invention, it is more preferable to set the upper limit of conditional expression (9) to 0.75.

In the present zoom lens system, at least one surface of the positive lens in the first lens group is an aspherical surface. By introducing an aspherical surface in this manner, the thickness of the zoom lens system can be thin. Upon narrowing the distance between the negative meniscus lens and the positive lens by the aspherical surface, it becomes possible to preferably correct curvature of field and lower coma in the wide-angle end state, so that the first lens group can be thinner. In order to secure the effect of the present invention, it is preferable that the object side surface of the positive lens is an aspherical surface.

In the present zoom lens system, it is preferable that the object side of the positive lens in the third lens group is an aspherical surface, and the aspherical surface is preferably such that positive refractive power becomes stronger in the periphery of the lens than in the area near the optical axis. With such aspherical shape, it becomes possible to preferably correct curvature of field in the telephoto end state, and also it becomes possible to preferably correct curvature of field and variation in astigmatism upon focusing on a close-rang object.

In the present zoom lens system, among respective lens groups composing the zoom lens system, a lens group or apportion of lens group can be moved in a direction perpendicular to the optical axis. With this movement, it becomes possible to move an image on the image plane to realize a vibration reduction lens system.

Each example of a zoom lens system according to an embodiment is explained below with reference to accompanying drawings.

EXAMPLE 1

FIG. 3 is a diagram showing a lens configuration of a zoom lens system according to Example 1 together with a zooming trajectory of each lens group.

In FIG. 3, a zoom lens system according to Example 1 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 1 are listed in Table 1. In [Specifications], f denotes a focal length of the zoom lens system, FNO denotes an f-number, $2\omega$ denotes an angle of view, and Ymax denotes a maximum image height.

In [Lens Data], the left most column shows the lens surface number counted in order from the object side, the second column "r" shows a radius of curvature of the lens surface, the third column "d" shows a distance to the next lens surface along the optical axis, the fourth column "vd" shows Abbe number of the material at d-line (wavelength $\lambda$=587.6 nm), and the fifth column "nd" shows refractive index of the material at d-line (wavelength $\lambda$=587.6 nm). The position of an aspherical surface is expressed by attaching "*" to the left side of the surface number and a paraxial radius of curvature is shown in the second column "r". In the second column "r", "r=∞" denotes a plane surface. In the fifth column "nd", refractive index of the air nd=1.000000 is omitted.

In [Aspherical Data], "E-n" denotes "$10^{-n}$". In each Example, an aspherical surface is exhibited by the following expression:

$$S(y) = (y^2/R) / \left[1 + [1 - \kappa(y^2/R^2)]^{1/2}\right] + C4 \times y^4 + C6 \times y^6 + C8 \times y^8 + C10 \times y^{10}$$

where y denotes a vertical height from the optical axis, S(y) denotes a sag amount which is a distance along the optical axis from the tangent surface at the vertex of the aspherical surface to the aspherical surface at the vertical height y from the optical axis, R denotes a radius of curvature of a reference sphere (paraxial radius of curvature), κ denotes a conical coefficient, and Cn denotes aspherical coefficient of n-th order.

In [Lens Data] and [Variable Distances], focal length f, imaging magnification β, distance between the object and the most object side lens surface D0 with respect to wide-angle end stat W, intermediate focal length state M, and telephoto end stat T are shown.

In [Values for Conditional Expressions], values for respective conditional expressions are shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]

|  | W | T |
|---|---|---|
| f = | 4.81 | 16.50 |
| FNO = | 2.86 | 5.62 |
| 2ω = | 77.4° | 24.7° |
| Ymax = | 3.60 | |

[Lens Data]

|  | r | d | nd | νd |
|---|---|---|---|---|
| 1) | 62.0000 | 1.1000 | 42.71 | 1.820800 |
| *2) | 4.8023 | 2.6500 | | |
| *3) | 11.7856 | 1.7500 | 21.15 | 1.906800 |
| 4) | 31.9452 | (d4) | | |
| 5) | ∞ | 0.4000 | | Aperture Stop S |
| >*6) | 5.8388 | 1.6500 | 53.22 | 1.693500 |
| 7) | −369.0030 | 0.3000 | | |
| 8) | 9.3983 | 1.7000 | 46.63 | 1.816000 |
| 9) | −10.1776 | 0.6000 | 31.31 | 1.903660 |
| 10) | 4.2031 | 0.7000 | | |
| 11) | 13.9065 | 1.3000 | 52.32 | 1.517420 |
| 12) | −20.0955 | (d12) | | |
| *13) | 13.5095 | 1.7000 | 82.56 | 1.497820 |
| 14) | −95.5633 | (d14) | | |
| 15) | ∞ | 0.5000 | 64.12 | 1.516800 |
| 16) | ∞ | (Bf) | | |

[Aspherical Data]

Surface Number: 2

K = 0.1500
C4 = 2.47630E−04
C6 = 5.17320E−06
C8 = −1.68170E−07
C10 = 1.85430E−09

Surface Number: 3

K = 1.8300
C4 = 2.66010E−05
C6 = 0.00000E+00
C8 = 0.00000E+00
C10 = 0.00000E+00

Surface Number: 6

K = 0.4325
C4 = −4.14000E−05
C6 = 0.00000E+00
C8 = 0.00000E+00
C10 = 0.00000E+00

Surface Number: 13

K = 2.7400

TABLE 1-continued

C4 = −8.77120E−05
C6 = 0.00000E+00
C8 = 0.00000E+00
C10 = 0.00000E+00

[Variable Distances]

|  | W | M | T |
|---|---|---|---|
| (Focusing on infinity) | | | |
| f | 4.81 | 8.80 | 16.50 |
| D0 | ∞ | ∞ | ∞ |
| d4 | 15.99623 | 7.01858 | 1.96799 |
| d12 | 4.56323 | 9.54069 | 19.14633 |
| d14 | 3.40042 | 3.40042 | 3.40042 |
| (Focusing on a close-rang object: 300 mm) | | | |
| β | −0.01791 | −0.03208 | −0.05866 |
| D0 | 261.1651 | 265.1654 | 260.6103 |
| d4 | 15.99623 | 7.01858 | 1.96799 |
| d12 | 4.34707 | 8.85819 | 17.04257 |
| d14 | 3.61659 | 4.08292 | 5.50418 |

[Values for Conditional Expressions]

(1): $ft \times Ymax/\{fw \times (fw + ft)\}$ = 0.57951
(2): $|f1|/(fw \times ft)^{1/2}$ = 1.25720
(3): fw/TL = 0.12211
(4): (Rb + Ra)/(Rb − Ra) = 0.75228
(5): ν31 = 82.56
(6): fL11/f1 = 0.57120
(7): n23 − n24 = 0.38624
(8): ν23 = 31.31
(9): Rc/Rd = 0.62126

Figure 4A:
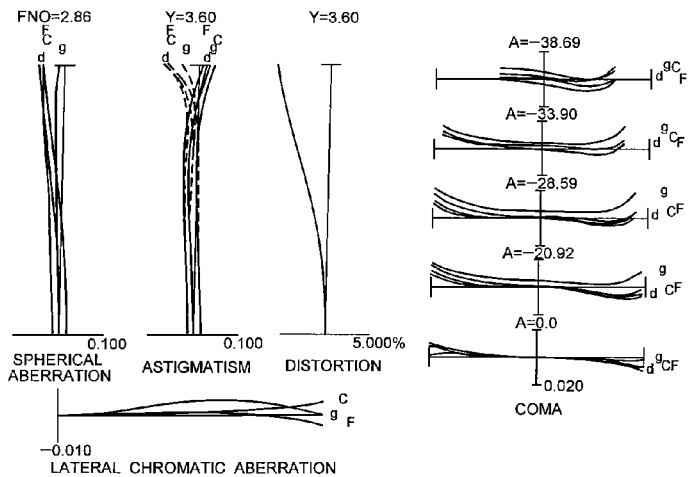
Figure 4B:
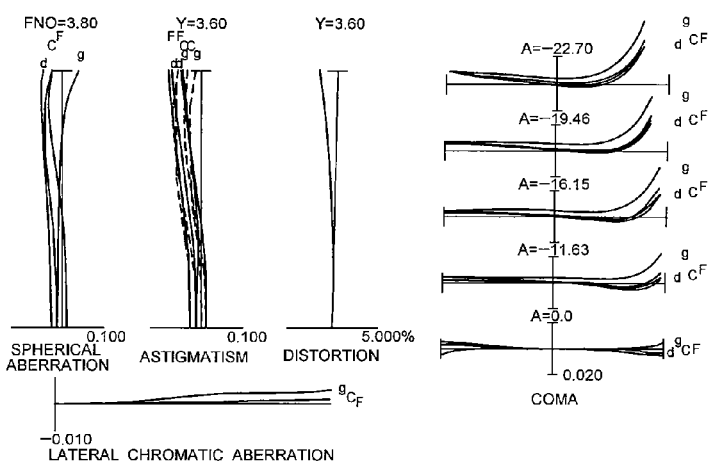
Figure 4C:
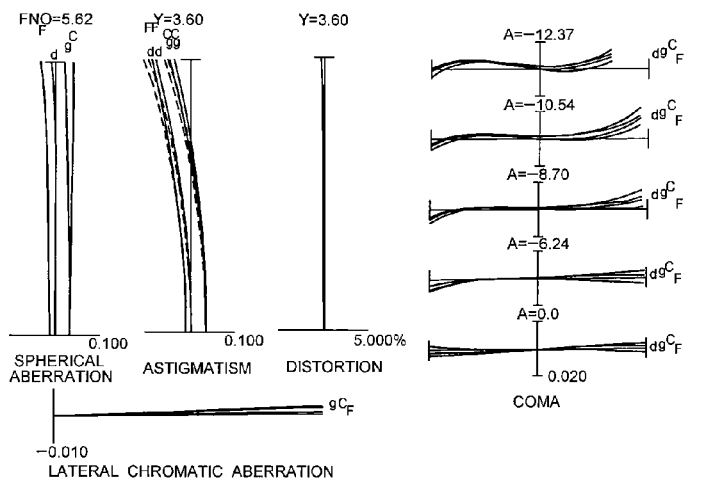

FIGS. 4A, 4B and 4C are graphs showing various aberrations of the zoom lens system according to Example 1 upon focusing on infinity in which FIG. 4A is in a wide-angle end state, FIG. 4B is in an intermediate focal length state, and FIG. 4C is in a telephoto end state.

Figure 5A:
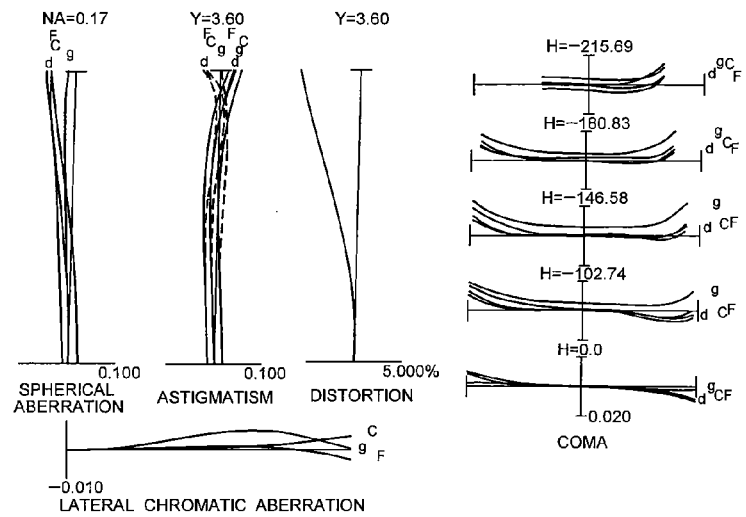
Figure 5B:
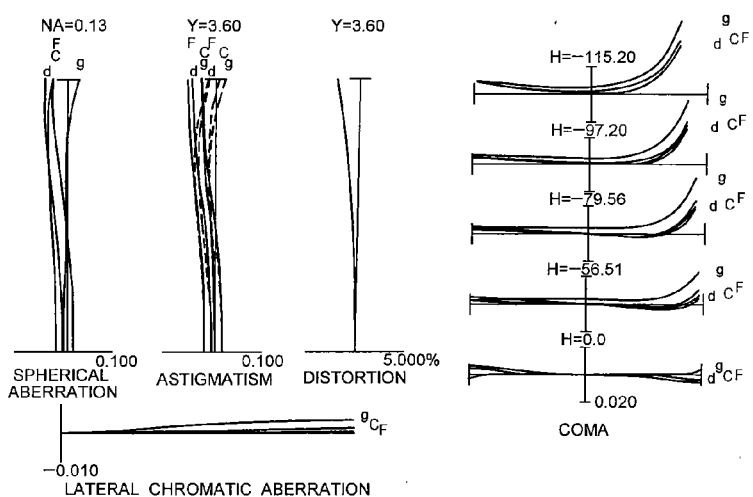
Figure 5C:
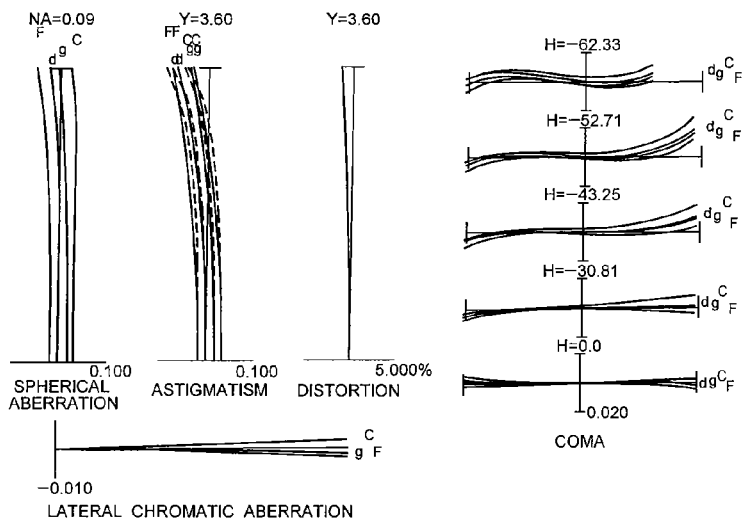

FIGS. 5A, 5B and 5C are graphs showing various aberrations of the zoom lens system according to Example 1 upon focusing on a close-rang object in which FIG. 5A is in a wide-angle end state, FIG. 5B is in an intermediate focal length state, and FIG. 5C is in a telephoto end state.

In respective graphs, FNO denotes an f-number, Y denotes an image height, A denotes a half angle of view (unit: degree), H denotes an object height.

In respective graphs, d denotes aberration curve at d-line (wavelength λ=587.6 nm), g denotes aberration curve at g-line (wavelength λ=435.8 nm), C denotes aberration curve at C-line (wavelength λ=656.3 nm), and F denotes aberration curve at F-line (wavelength λ=486.1 nm). In the graph showing astigmatism, a solid line indicates a sagittal image plane, and a broken line indicates a meridional image plane. The above-described explanation regarding various aberration graphs is the same as the other examples.

As is apparent from the respective graphs, the zoom lens system according to Example 1 shows superb optical performance as a result of good corrections to various aberrations in the wide-angle end state W, in the intermediate focal length state M, and in the telephoto end state T over entire image-taking range from infinity to a close-rang object.

EXAMPLE 2

FIG. 6 is a diagram showing a lens configuration of a zoom lens system according to Example 2 together with a zooming trajectory of each lens group.

In FIG. 6, a zoom lens system according to Example 2 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 2 are listed in Table 2.

TABLE 2

[Specifications]

|  | W | T |
|---|---|---|
| f = | 4.81 | 16.50 |
| FNO = | 2.86 | 5.58 |
| 2ω = | 77.4° | 24.8° |
| Ymax = | 3.60 | |

[Lens Data]

| | r | d | nd | νd |
|---|---|---|---|---|
| 1) | 66.4286 | 1.1000 | 42.71 | 1.820800 |
| *2) | 5.2196 | 2.8500 | | |
| *3) | 12.5754 | 1.7500 | 21.15 | 1.906800 |
| 4) | 32.0968 | (d4) | | |
| 5) | ∞ | 0.4000 | Aperture Stop S | |
| *6) | 5.8236 | 1.6500 | 53.22 | 1.693500 |
| 7) | −73.1640 | 0.3000 | | |
| 8) | 8.7440 | 1.7000 | 52.29 | 1.755000 |
| 9) | −10.7157 | 0.6000 | 32.35 | 1.850260 |
| 10) | 3.9312 | 0.7500 | | |
| 11) | 17.4699 | 1.3000 | 58.89 | 1.518230 |
| 12) | −28.9368 | (d12) | | |
| *13) | 18.0000 | 1.7000 | 82.56 | 1.497820 |
| 14) | −27.4095 | (d14) | | |
| 15) | ∞ | 0.5000 | 64.12 | 1.516800 |
| 16) | ∞ | (Bf) | | |

TABLE 2-continued

[Aspherical Data]

Surface Number: 2

K = 0.1614
C4 = 2.46350E−04
C6 = 2.73920E−06
C8 = −1.27140E−07
C10 = 1.02310E−09

Surface Number: 3

K = 0.0592
C4 = 1.48600E−04
C6 = 0.00000E+00
C8 = 0.00000E+00
C10 = 0.00000E+00

Surface Number: 6

K = 0.3901
C4 = −6.48660E−05
C6 = 0.00000E+00
C8 = 0.00000E+00
C10 = 0.00000E+00

Surface Number: 13

K = 4.9245
C4 = −8.55640E−05
C6 = 0.00000E+00
C8 = 0.00000E+00
C10 = 0.00000E+00

[Variable Distances]

| | W | M | T |
|---|---|---|---|
| (Focusing on infinity) | | | |
| f | 4.81 | 8.80 | 16.50 |
| D0 | ∞ | ∞ | ∞ |
| d4 | 16.98530 | 7.37241 | 1.96446 |
| d12 | 3.98625 | 8.63480 | 17.60567 |
| d14 | 3.30628 | 3.30628 | 3.30628 |
| (Focusing on a close-rang object: 300 mm) | | | |
| β | −0.01791 | −0.03196 | −0.05808 |
| D0 | 260.5821 | 265.5465 | 261.9835 |
| d4 | 16.98530 | 7.37241 | 1.96446 |
| d12 | 3.77076 | 7.95875 | 15.54431 |
| d14 | 3.52177 | 3.98233 | 5.36764 |

[Values for Conditional Expressions]

(1): ft × Ymax/{fw × (fw + ft)} = 0.57951
(2): |f1|/(fw × ft)$^{1/2}$ = 1.34700
(3): fw/TL = 0.12203
(4): (Rb + Ra)/(Rb − Ra) = 0.20721
(5): ν31 = 82.56
(6): fL11/f1 = 0.57982
(7): n23 − n24 = 0.33203
(8): ν23 = 32.35
(9): Rc/Rd = 0.66601

Figure 7A:
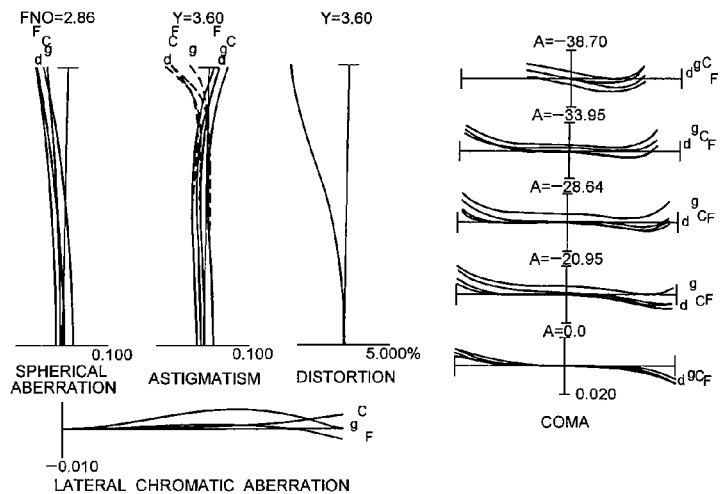
Figure 7B:
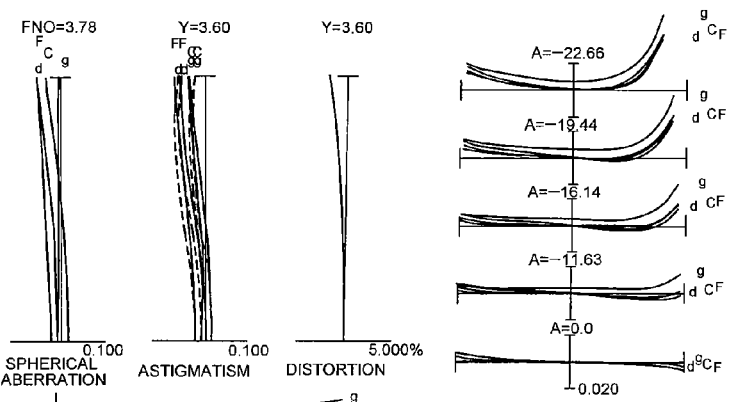
Figure 7C:
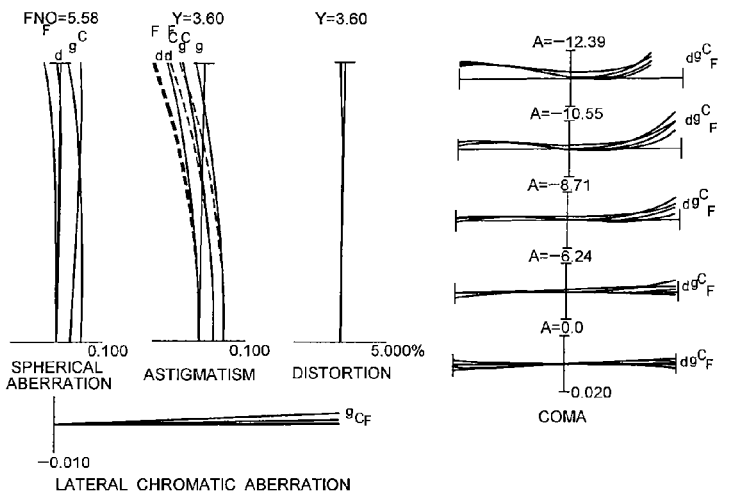

FIGS. 7A, 7B and 7C are graphs showing various aberrations of the zoom lens system according to Example 2 upon focusing on infinity in which FIG. 7A is in a wide-angle end state, FIG. 7B is in an intermediate focal length state, and FIG. 7C is in a telephoto end state.

Figure 8A:
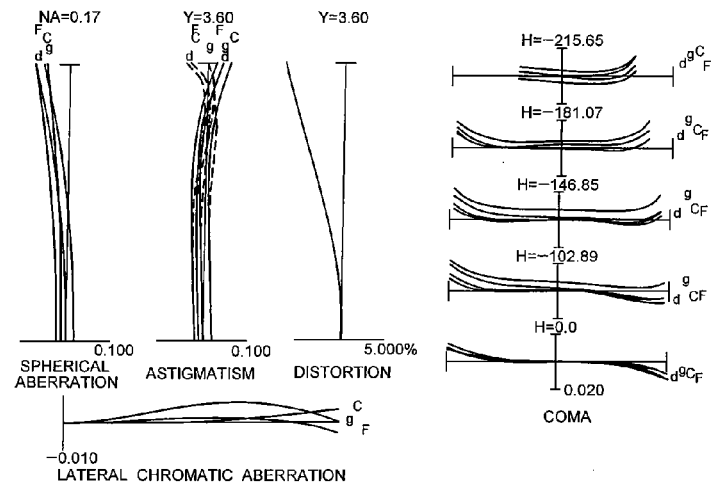
Figure 8B:
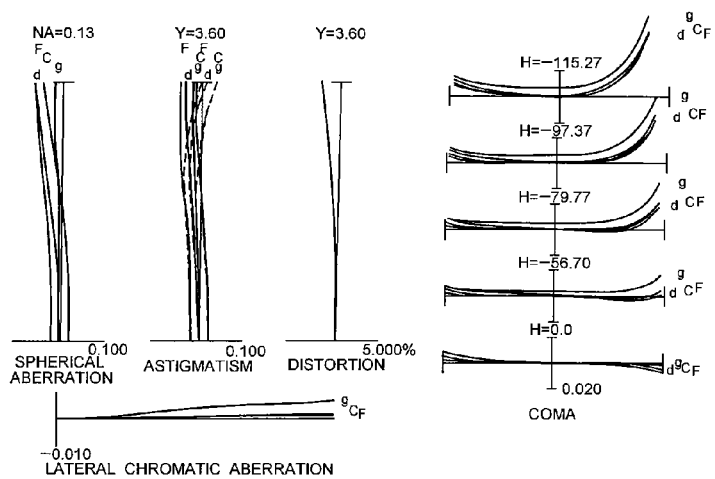
Figure 8C:
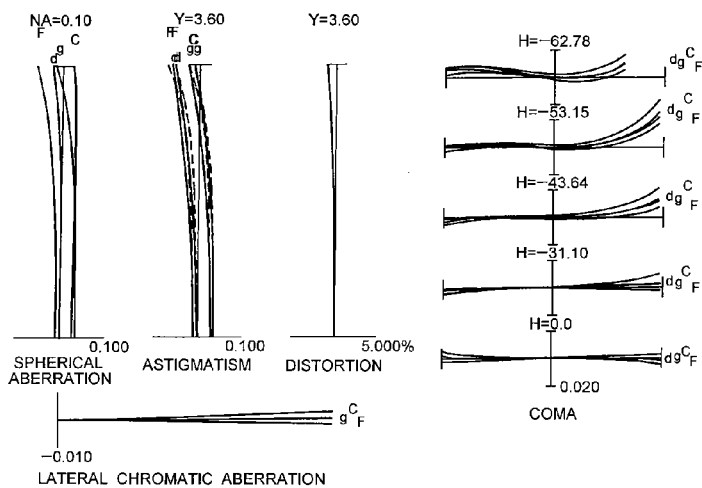

FIGS. 8A, 8B and 8C are graphs showing various aberrations of the zoom lens system according to Example 2 upon focusing on a close-rang object in which FIG. 8A is in a wide-angle end state, FIG. 8B is in an intermediate focal length state, and FIG. 8C is in a telephoto end state.

As is apparent from the respective graphs, the zoom lens system according to Example 2 shows superb optical performance as a result of good corrections to various aberrations in the wide-angle end state W, in the intermediate focal length state M, and in the telephoto end state T over entire image-taking range from infinity to a close-rang object.

EXAMPLE 3

FIG. 9 is a diagram showing a lens configuration of a zoom lens system according to Example 3 together with a zooming trajectory of each lens group.

In FIG. 9, a zoom lens system according to Example 3 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 3 are listed in Table 3.

TABLE 3

[Specifications]

|  | W | T |
|---|---|---|
| f = | 4.81 | 16.50 |
| FNO = | 2.86 | 5.66 |
| 2ω = | 77.3° | 24.7° |
| Ymax = | 3.60 | |

[Lens Data]

|  | r | d | nd | νd |
|---|---|---|---|---|
| 1) | 65.0000 | 1.1000 | 42.71 | 1.820800 |
| *2) | 4.5216 | 2.5000 | | |
| *3) | 11.5186 | 1.7500 | 21.15 | 1.906800 |
| 4) | 34.1760 | (d4) | | |
| 5) | ∞ | 0.4000 | Aperture Stop S | |
| *6) | 5.7975 | 1.6500 | 53.22 | 1.693500 |
| 7) | 119.2231 | 0.3000 | | |
| 8) | 9.9279 | 1.7000 | 46.63 | 1.816000 |
| 9) | −12.4084 | 0.6000 | 31.31 | 1.903660 |
| 10) | 4.3266 | 0.7000 | | |
| 11) | 11.5176 | 1.3000 | 58.89 | 1.518230 |
| 12) | −17.4568 | (d12) | | |
| *13) | 11.5000 | 1.7000 | 91.20 | 1.456000 |
| 14) | −1250.3048 | (d14) | | |
| 15) | ∞ | 0.5000 | 64.12 | 1.516800 |
| 16) | ∞ | (Bf) | | |

[Aspherical Data]

Surface Number: 2

K = 0.1500
C4 = 2.19490E−04
C6 = 7.09410E−06
C8 = −2.35900E−07
C10 = 3.65970E−09

Surface Number: 3

K = 2.2992
C4 = −1.23090E−05
C6 = 0.00000E+00
C8 = 0.00000E+00
C10 = 0.00000E+00

Surface Number: 6

K = 0.4355
C4 = −1.01430E−05
C6 = 0.00000E+00
C8 = 0.00000E+00
C10 = 0.00000E+00

Surface Number: 13

K = 1.9690
C4 = −1.07400E−04
C6 = 0.00000E+00
C8 = 0.00000E+00
C10 = 0.00000E+00

[Variable Distances]

|  | W | M | T |
|---|---|---|---|
| (Focusing on infinity) | | | |
| f | 4.81 | 8.80 | 16.50 |
| D0 | ∞ | ∞ | ∞ |
| d4 | 15.03371 | 6.66824 | 1.96205 |
| d12 | 4.85236 | 10.19407 | 20.50264 |
| d14 | 3.24257 | 3.24257 | 3.24257 |
| (Focusing on a close-rang object: 300 mm) | | | |
| β | −0.01790 | −0.03219 | −0.05914 |
| D0 | 261.7861 | 264.8100 | 259.2075 |
| d4 | 15.03371 | 6.66824 | 1.96205 |
| d12 | 4.63999 | 9.51918 | 18.39947 |
| d14 | 3.45494 | 3.91746 | 5.34575 |

[Values for Conditional Expressions]

(1): ft × Ymax/{fw × (fw + ft)} = 0.57951
(2): |f1|/(fw × ft)$^{1/2}$ = 1.17862
(3): fw/TL = 0.11791
(4): (Rb + Ra)/(Rb − Ra) = 0.98177
(5): ν31 = 91.20
(6): fL11/f1 = 0.56853
(7): n23 − n24 = 0.38543
(8): ν23 = 31.31
(9): Rc/Rd = 0.58396

Figure 10A:
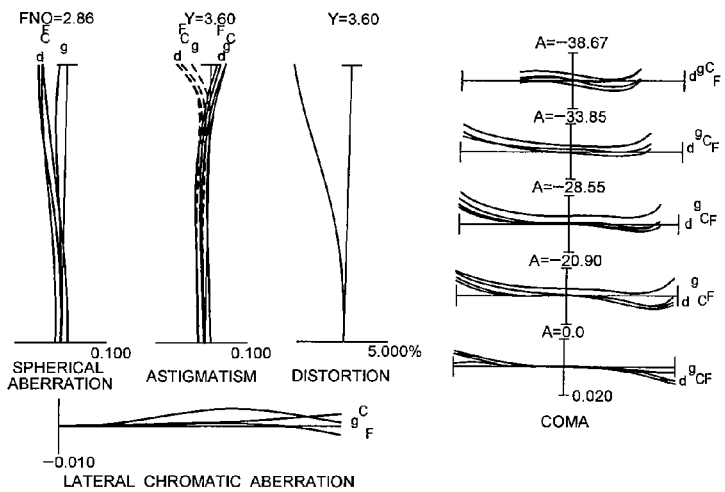
Figure 10B:
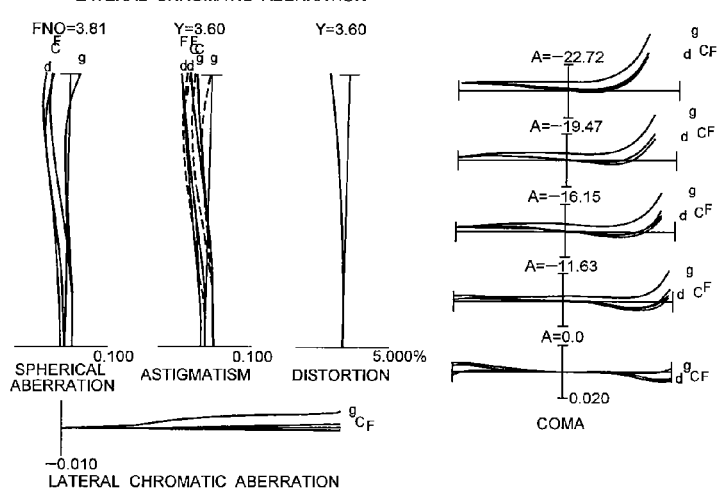
Figure 10C:
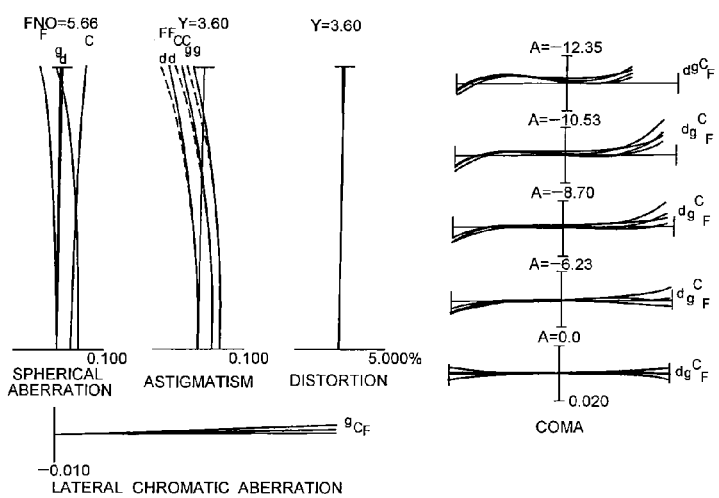

FIGS. 10A, 10B and 10C are graphs showing various aberrations of the zoom lens system according to Example 3 upon focusing on infinity in which FIG. 10A is in a wide-angle end state, FIG. 10B is in an intermediate focal length state, and FIG. 10C is in a telephoto end state.

Figure 11A:
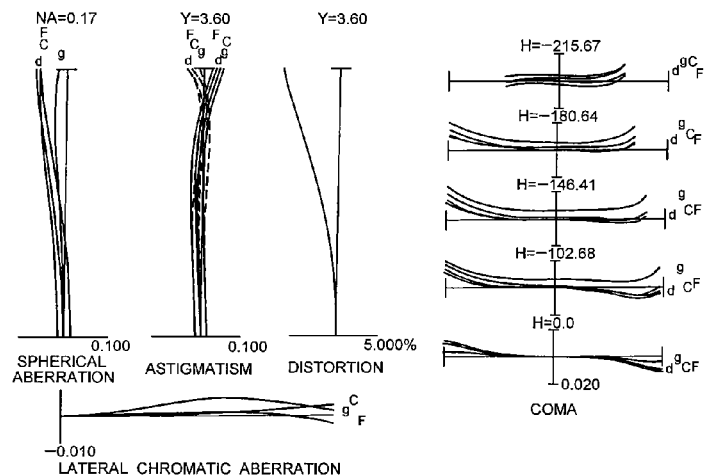
Figure 11B:
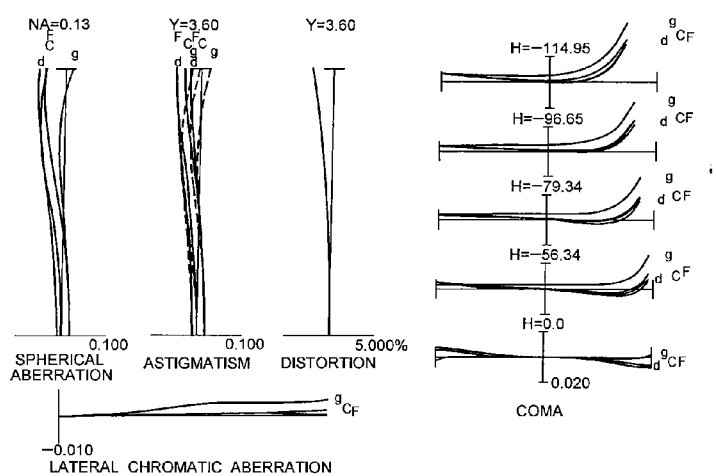
Figure 11C:
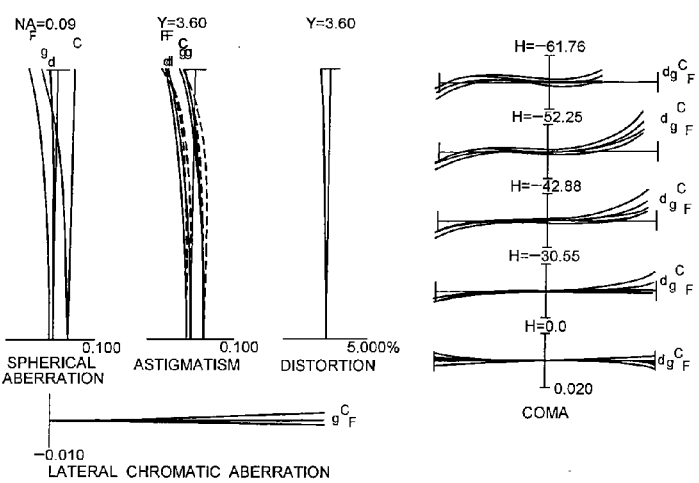

FIGS. 11A, 11B and 11C are graphs showing various aberrations of the zoom lens system according to Example 3 upon focusing on a close-rang object in which FIG. 11A is in a wide-angle end state, FIG. 11B is in an intermediate focal length state, and FIG. 11C is in a telephoto end state.

As is apparent from the respective graphs, the zoom lens system according to Example 3 shows superb optical performance as a result of good corrections to various aberrations in the wide-angle end state W, in the intermediate focal length state M, and in the telephoto end state T over entire image-taking range from infinity to a close-rang object.

EXAMPLE 4

FIG. 12 is a diagram showing a lens configuration of a zoom lens system according to Example 4 together with a zooming trajectory of each lens group.

In FIG. 12, a zoom lens system according to Example 4 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 4 are listed in Table 4.

TABLE 4

[Specifications]

|   | W | T |
|---|---|---|
| f = | 4.81 | 16.50 |
| FNO = | 2.92 | 5.67 |
| 2ω = | 77.4° | 24.6° |

TABLE 4-continued

| Ymax = | 3.60 | | |
|---|---|---|---|

[Lens Data]

|   | r | d | nd | νd |
|---|---|---|---|---|
| 1) | 58.0000 | 1.1000 | 42.71 | 1.820800 |
| *2) | 4.6965 | 2.4500 | | |
| *3) | 10.8719 | 1.7500 | 21.15 | 1.906800 |
| 4) | 28.4117 | (d4) | | |
| 5) | ∞ | 0.4000 | Aperture Stop S | |
| *6) | 5.8878 | 1.6000 | 53.22 | 1.693500 |
| 7) | 177.6627 | 0.3000 | | |
| 8) | 9.8962 | 1.7500 | 46.63 | 1.816000 |
| 9) | −11.1646 | 0.6000 | 31.31 | 1.903660 |
| 10) | 4.3404 | 0.7000 | | |
| 11) | 11.7963 | 1.3000 | 56.71 | 1.607380 |
| 12) | −28.0907 | (d12) | | |
| *13) | 9.7000 | 1.7000 | 82.56 | 1.497820 |
| 14) | 49.4505 | (d14) | | |
| 15) | ∞ | 0.5000 | 64.12 | 1.516800 |
| 16) | ∞ | (Bf) | | |

[Aspherical Data]

Surface Number: 2 k = 0.1500
C4 = 1.91050E−04
C6 = 5.54180E−06
C8 = −1.60350E−07
C10 = 2.32790E−09

Surface Number: 3 k = 1.8300
C4 = −3.14850E−05
C6 = 0.00000E+00
C8 = 0.00000E+00
C10 = 0.00000E+00

Surface Number: 6 k = 0.4230
C4 = 1.47380E−05
C6 = 0.00000E+00
C8 = 0.00000E+00
C10 = 0.00000E+00

Surface Number: 13 k = 1.5525
C4 = −9.66340E−05
C6 = 0.00000E+00
C8 = 0.00000E+00
C10 = 0.00000E+00

[Variable Distances]

|   | W | M | T |
|---|---|---|---|
| (Focusing on infinity) | | | |
| f | 4.81 | 8.80 | 16.50 |
| D0 | ∞ | ∞ | ∞ |
| d4 | 15.99055 | 7.01290 | 1.96231 |
| d12 | 5.19942 | 10.17688 | 19.78252 |
| d14 | 3.00784 | 3.00784 | 3.00784 |
| (Focusing on a close-rang object: 300 mm) | | | |
| β | −0.01790 | −0.03208 | −0.05865 |
| D0 | 261.1271 | 265.1274 | 260.5723 |
| d4 | 15.99055 | 7.01290 | 1.96231 |
| d12 | 4.98328 | 9.49444 | 17.67893 |
| d14 | 3.22398 | 3.69028 | 5.11143 |

[Values for Conditional Expressions]

(1): ft × Ymax/{ fw × (fw + ft) } = 0.57951
(2): | f1 |/(fw × ft)$^{1/2}$ = 1.25720
(3): fw/TL = 0.12200
(4): (Rb + Ra)/(Rb − Ra) = 1.48804

TABLE 4-continued (5): ν31 = 82.56
(6): fL11/f1 = 0.56111
(7): n23 − n24 = 0.29628
(8): ν23 = 31.31
(9): Rc/Rd = 0.59496

Figure 13A:
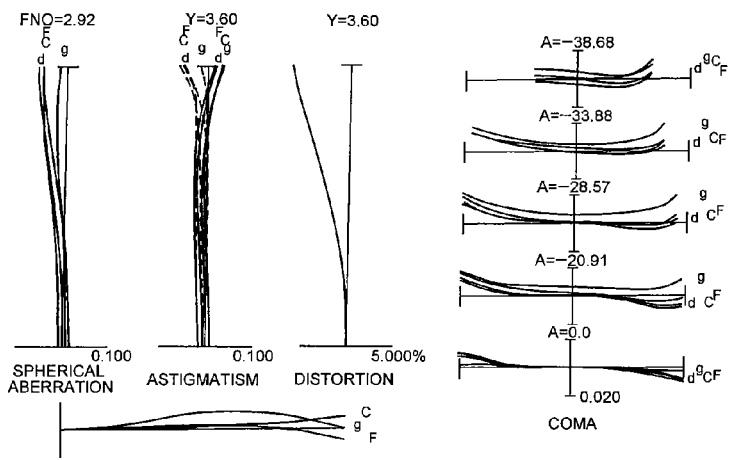
Figure 13B:
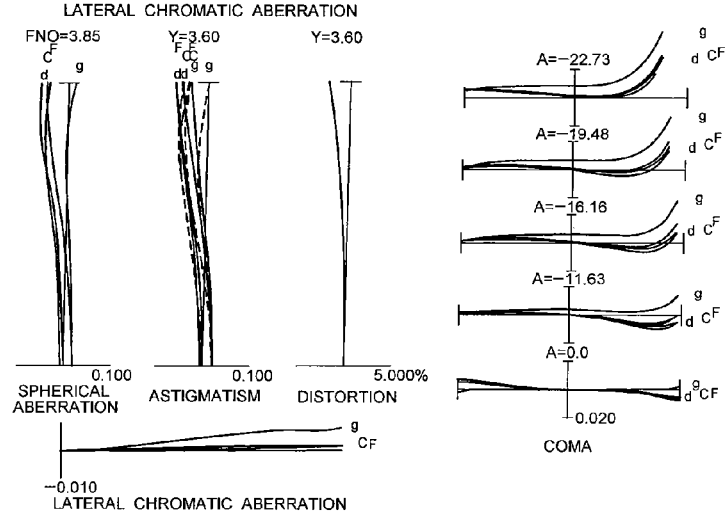
Figure 13C:
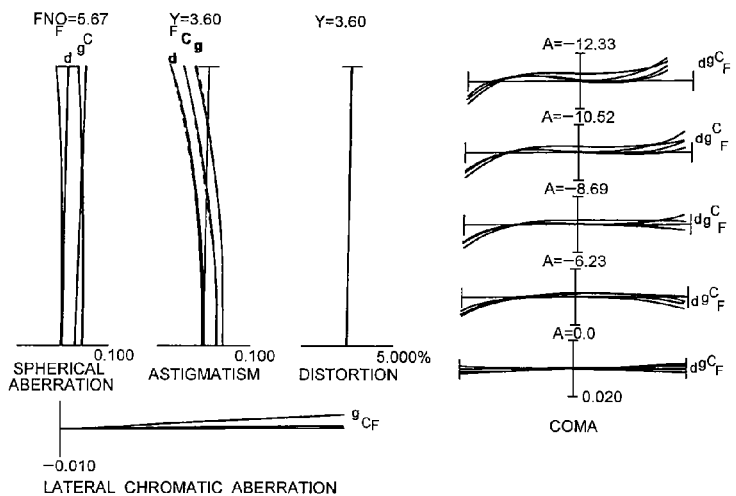

FIGS. 13A, 13B and 13C are graphs showing various aberrations of the zoom lens system according to Example 4 upon focusing on infinity in which FIG. 13A is in a wide-angle end state, FIG. 13B is in an intermediate focal length state, and FIG. 13C is in a telephoto end state.

Figure 14A:
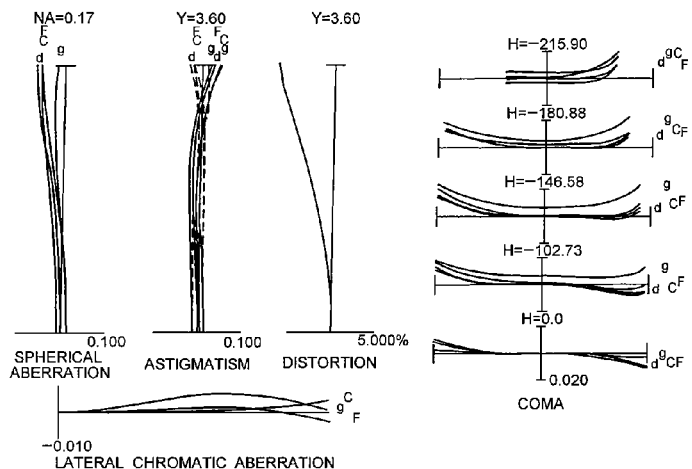
Figure 14B:
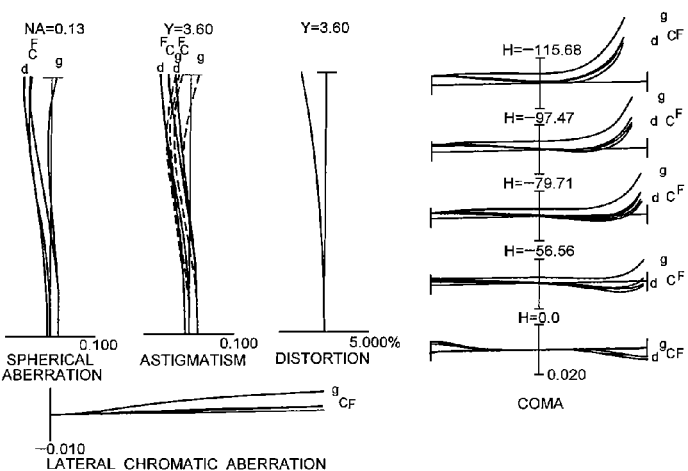
Figure 14C:
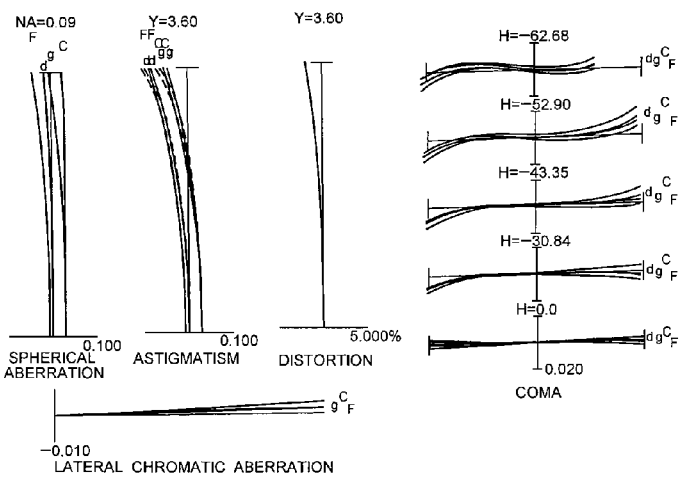

FIGS. 14A, 14B and 14C are graphs showing various aberrations of the zoom lens system according to Example 4 upon focusing on a close-rang object in which FIG. 14A is in a wide-angle end state, FIG. 14B is in an intermediate focal length state, and FIG. 14C is in a telephoto end state.

As is apparent from the respective graphs, the zoom lens system according to Example 4 shows superb optical performance as a result of good corrections to various aberrations in the wide-angle end state W, in the intermediate focal length state M, and in the telephoto end state T over entire image-taking range from infinity to a close-rang object.

EXAMPLE 5

FIG. 15 is a diagram showing a lens configuration of a zoom lens system according to Example 5 together with a zooming trajectory of each lens group.

In FIG. 15, a zoom lens system according to Example 5 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the image plane I side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 5 are listed in Table 5.

TABLE 5

[Specifications]

|  | W | T |
|---|---|---|
| f = | 4.81 | 16.50 |
| FNO = | 2.84 | 5.60 |
| 2ω = | 77.4° | 24.6° |
| Ymax = | 3.60 | |

[Lens Data]

|  | r | d | nd | νd |
|---|---|---|---|---|
| 1) | 62.0000 | 1.1000 | 42.71 | 1.820800 |
| *2) | 4.9347 | 2.8000 | | |
| *3) | 12.9259 | 1.7500 | 21.15 | 1.906800 |
| 4) | 35.9751 | (d4) | | |
| 5) | ∞ | 0.4000 | Aperture Stop S | |
| *6) | 5.9064 | 1.6000 | 53.22 | 1.693500 |
| 7) | −185.6734 | 0.3000 | | |
| 8) | 9.0667 | 1.7500 | 46.63 | 1.816000 |
| 9) | −10.7695 | 0.6000 | 31.31 | 1.903660 |
| 10) | 4.1588 | 0.7000 | | |
| 11) | 17.0912 | 1.3000 | 52.32 | 1.517420 |
| 12) | −18.8274 | (d12) | | |
| 13) | 25.0000 | 1.7000 | 91.20 | 1.456000 |
| *14) | −18.9097 | (d14) | | |
| 15) | ∞ | 0.5000 | 64.12 | 1.516800 |
| 16) | ∞ | (Bf) | | |

[Aspherical Data]

Surface Number: 2 k = 0.1500
C4 = 3.52870E−04
C6 = 4.63320E−06
C8 = −1.50190E−07
C10 = 1.10830E−09

Surface Number: 3 k = 1.8300
C4 = 9.73150E−05
C6 = 0.00000E+00
C8 = 0.00000E+00
C10 = 0.00000E+00

Surface Number: 6 k = 0.4230
C4 = −6.31670E−05
C6 = 0.00000E+00
C8 = 0.00000E+00
C10 = 0.00000E+00

Surface Number: 14 k = 3.7977
C4 = 1.33350E−04
C6 = 0.00000E+00
C8 = 0.00000E+00
C10 = 0.00000E+00

[Variable Distances]

|  | W | M | T |
|---|---|---|---|
| (Focusing on infinity) | | | |
| f | 4.81 | 8.80 | 16.50 |
| D0 | ∞ | ∞ | ∞ |
| d4 | 15.99579 | 7.01814 | 1.96755 |
| d12 | 3.95555 | 8.93301 | 18.53865 |
| D14 | 3.89101 | 3.89101 | 3.89101 |

TABLE 5-continued (Focusing on a close-rang object: 300 mm)

| β | −0.01791 | −0.03209 | −0.05866 |
|---|---|---|---|
| D0 | 261.1326 | 265.1329 | 260.5778 |
| d4 | 15.99579 | 7.01814 | 1.96755 |
| d12 | 3.73937 | 8.25045 | 16.43472 |
| d14 | 4.10719 | 4.57357 | 5.99493 |

[Values for Conditional Expressions]

(1): ft × Ymax/{fw × (fw + ft)} = 0.57951
(2): |f1|/(fw × ft)$^{1/2}$ = 1.25720
(3): fw/TL = 0.12201
(4): (Rb + Ra)/(Rb − Ra) = −0.13870
(5): v31 = 91.20
(6): fL11/f1 = 0.58833
(7): n23 − n24 = 0.38624
(8): v23 = 31.31
(9): Rc/Rd = 0.65144

Figure 16A:
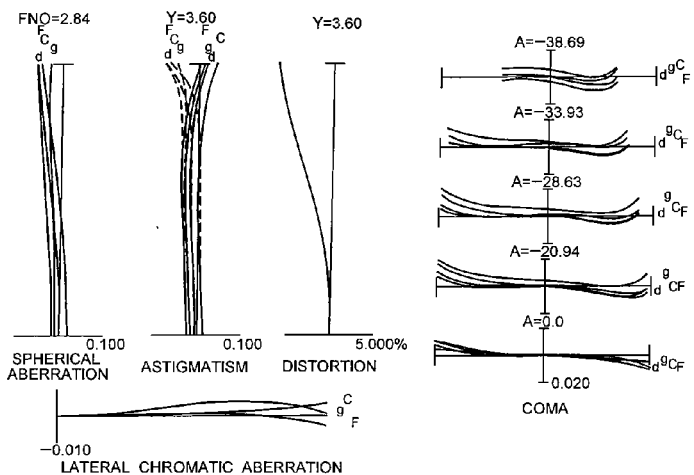
Figure 16B:
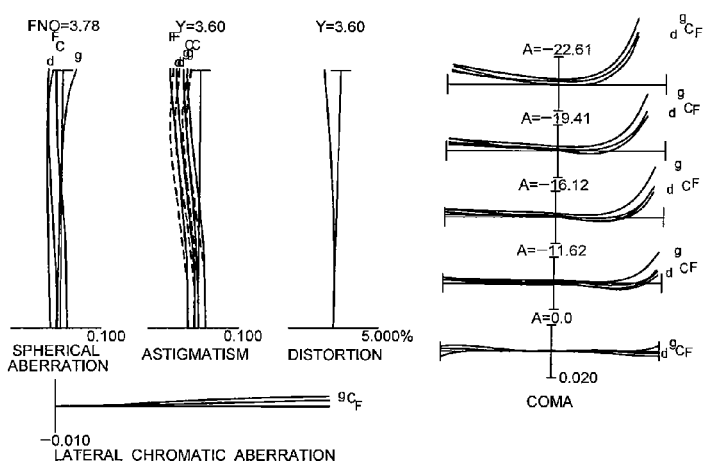
Figure 16C:
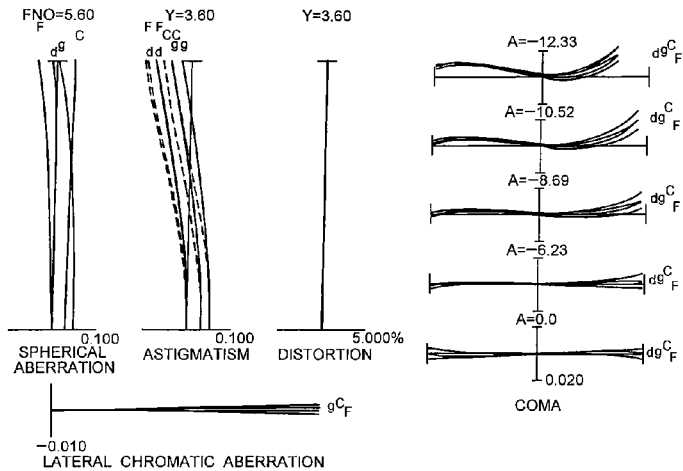

FIGS. 16A, 16B and 16C are graphs showing various aberrations of the zoom lens system according to Example 5 upon focusing on infinity in which FIG. 16A is in a wide-angle end state, FIG. 16B is in an intermediate focal length state, and FIG. 16C is in a telephoto end state.

Figure 17A:
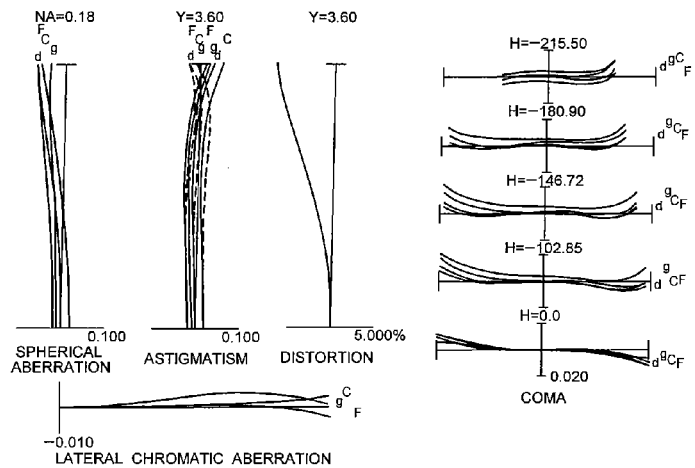
Figure 17B:
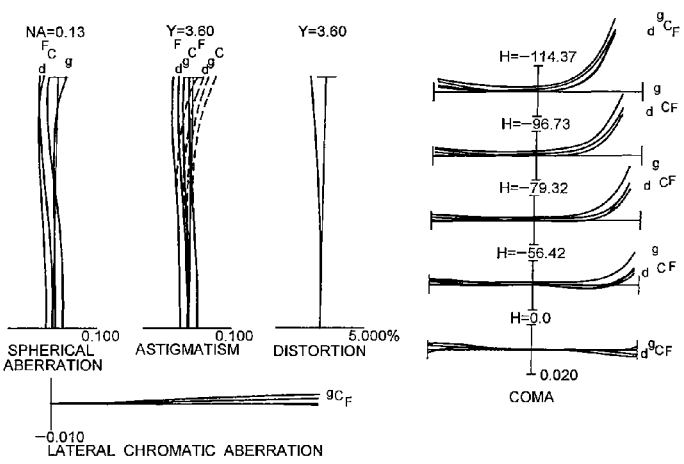
Figure 17C:
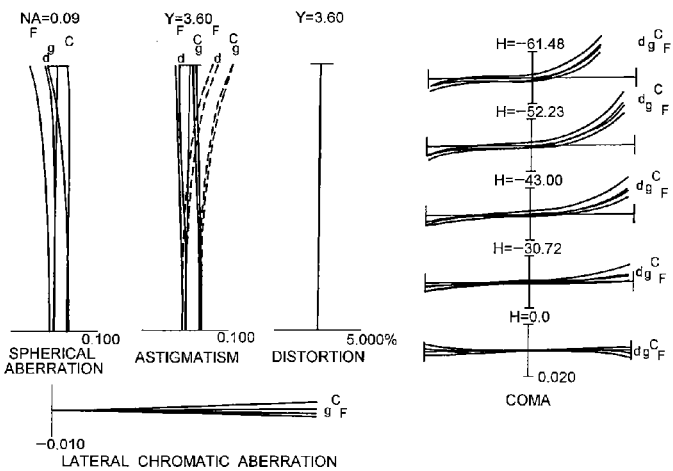

FIGS. 17A, 17B and 17C are graphs showing various aberrations of the zoom lens system according to Example 5 upon focusing on a close-rang object in which FIG. 17A is in a wide-angle end state, FIG. 17B is in an intermediate focal length state, and FIG. 17C is in a telephoto end state.

As is apparent from the respective graphs, the zoom lens system according to Example 5 shows superb optical performance as a result of good corrections to various aberrations in the wide-angle end state W, in the intermediate focal length state M, and in the telephoto end state T over entire image-taking range from infinity to a close-rang object.

EXAMPLE 6

Figure 18:
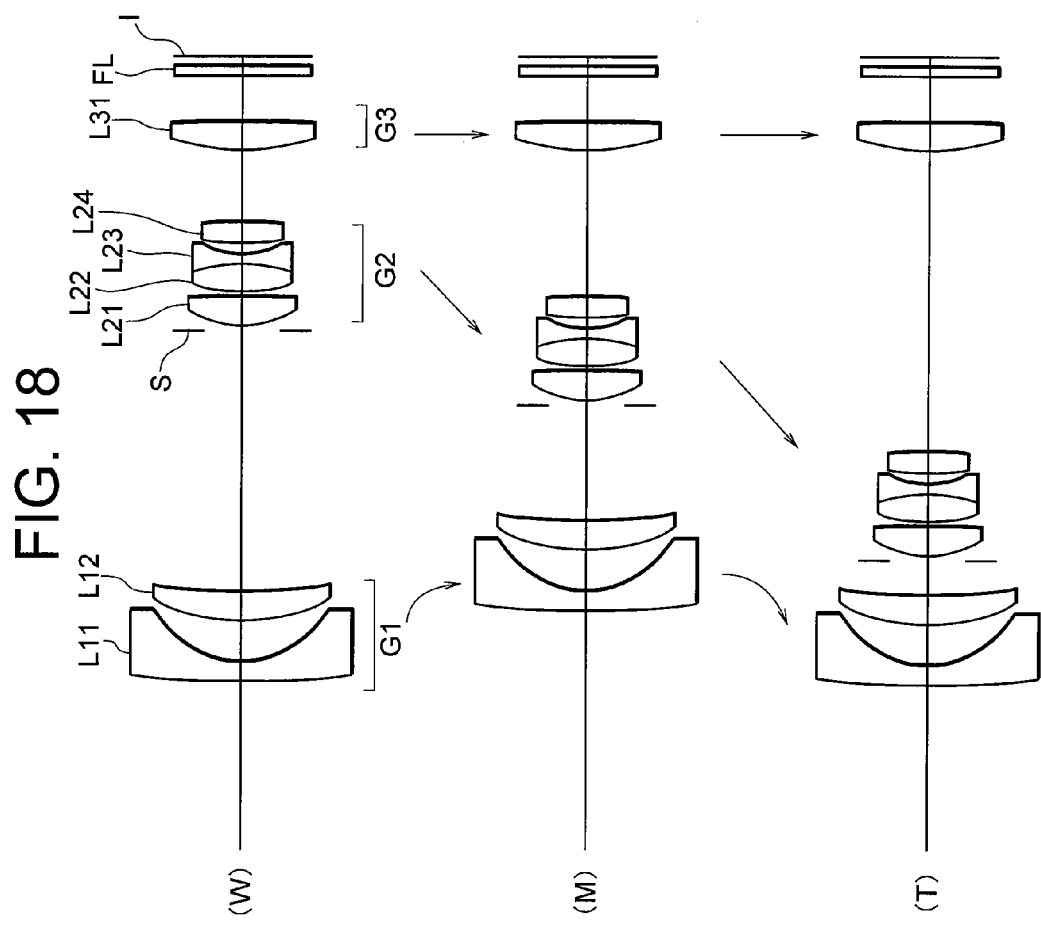
FIG. 18 is a diagram showing a lens configuration of a zoom lens system according to Example 6 together with a zooming trajectory of each lens group.

FIG. 18 is a diagram showing a lens configuration of a zoom lens system according to Example 6 together with a zooming trajectory of each lens group.

In FIG. 18, a zoom lens system according to Example 6 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the image plane I side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 6 are listed in Table 6.

TABLE 6

[Specifications]

|  | W | T |
|---|---|---|
| f = | 4.81 | 17.00 |
| FNO = | 2.79 | 5.65 |
| 2ω = | 77.3° | 23.9° |
| Ymax = | 3.60 | |

[Lens Data]

|  | r | d | nd | vd |
|---|---|---|---|---|
| 1) | 67.0000 | 1.1000 | 42.71 | 1.820800 |
| *2) | 4.8227 | 2.6000 | | |
| *3) | 11.8932 | 1.7500 | 21.15 | 1.906800 |
| 4) | 33.3246 | (d4) | | |
| 5) | ∞ | 0.4000 | Aperture Stop S | |
| *6) | 5.5196 | 1.8000 | 53.22 | 1.693500 |
| 7) | −91.2466 | 0.3000 | | |
| 8) | 8.8018 | 1.6000 | 40.77 | 1.883000 |
| 9) | −13.7085 | 0.6000 | 28.27 | 2.003300 |
| 10) | 3.9205 | 0.7000 | | |
| 11) | 10.9202 | 1.3000 | 39.23 | 1.595510 |
| 12) | −54.5371 | (d12) | | |
| *13) | 13.0570 | 1.7000 | 82.56 | 1.497820 |
| 14) | −95.7012 | (d14) | | |
| 15) | ∞ | 0.5000 | 64.12 | 1.516800 |
| 16) | ∞ | (Bf) | | |

[Aspherical Data]

Surface Number: 2 k = 0.1500
C4 = 2.46190E−04
C6 = 5.67570E−06
C8 = −2.20830E−07
C10 = 2.86050E−09

Surface Number: 3 k = 1.8300
C4 = 3.01910E−05
C6 = 0.00000E+00
C8 = 0.00000E+00
C10 = 0.00000E+00

Surface Number: 6 k = 0.3052
C4 = 2.21230E−05
C6 = 0.00000E+00
C8 = 0.00000E+00
C10 = 0.00000E+00

Surface Number: 13 k = 2.8390
C4 = −1.08200E−04
C6 = 0.00000E+00
C8 = 0.00000E+00
C10 = 0.00000E+00

TABLE 6-continued

[Variable Distances]

|   | W | M | T |
|---|---|---|---|
| (Focusing on infinity) | | | |
| f | 4.81 | 8.80 | 17.00 |
| D0 | ∞ | ∞ | ∞ |
| d4 | 15.89339 | 7.07705 | 1.95050 |
| d12 | 4.44648 | 9.14984 | 18.81590 |
| d14 | 2.89606 | 2.89606 | 2.89606 |
| (Focusing on a close-rang object: 300 mm) | | | |
| β | −0.01785 | −0.03193 | −0.05975 |
| D0 | 261.8948 | 266.0079 | 261.4683 |
| d4 | 15.89339 | 7.07705 | 1.95050 |
| d12 | 4.21772 | 8.43311 | 16.53634 |
| d14 | 3.12482 | 3.61279 | 5.17561 |

[Values for Conditional Expressions]

(1): ft × Ymax/{fw × (fw + ft)} = 0.58338
(2): | f1 | /(fw × ft)$^{1/2}$ = 1.23857
(3): fw/TL = 0.12483
(4): (Rb + Ra)/(Rb − Ra) = 0.75989
(5): ν31 = 82.56
(6): fL11/f1 = 0.56984
(7): n23 − n24 = 0.40779
(8): ν23 = 28.27
(9): Rc/Rd = 0.62710

Figure 19A:
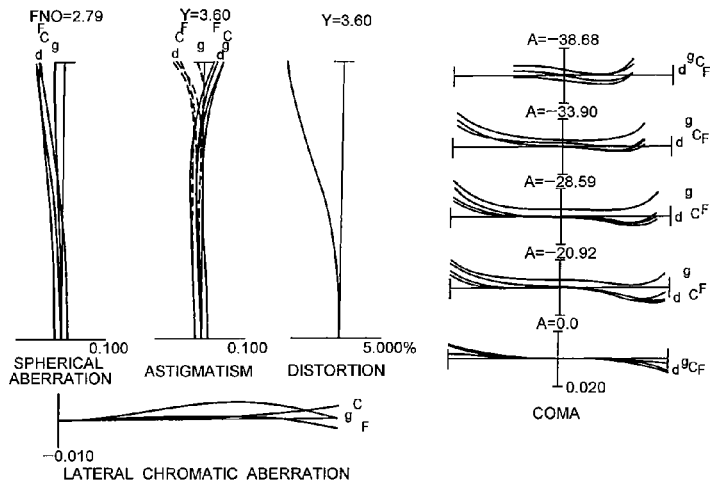
Figure 19B:
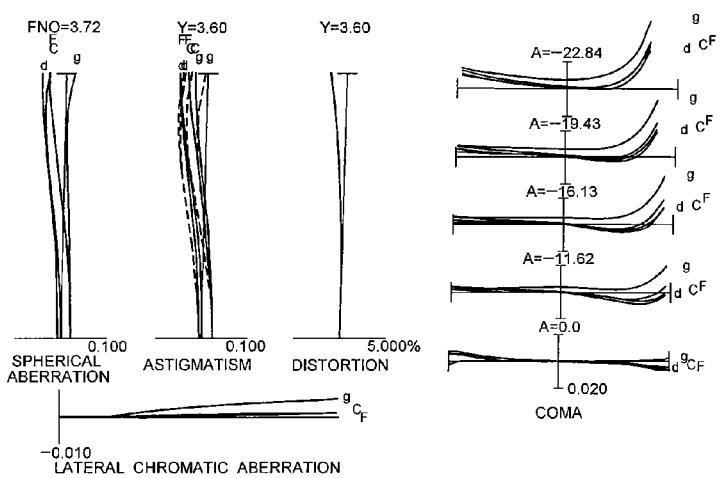
Figure 19C:
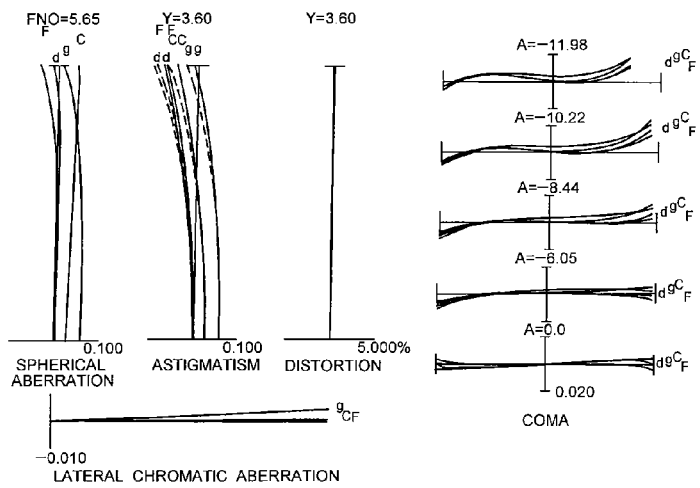

FIGS. 19A, 19B and 19C are graphs showing various aberrations of the zoom lens system according to Example 6 upon focusing on infinity in which FIG. 19A is in a wide-angle end state, FIG. 19B is in an intermediate focal length state, and FIG. 19C is in a telephoto end state.

Figure 20A:
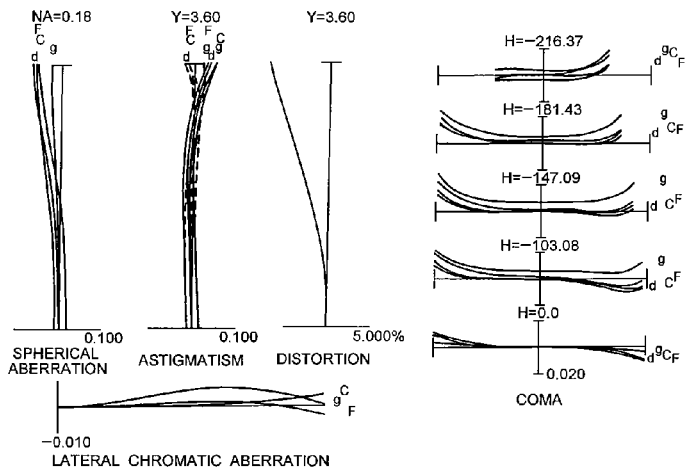
Figure 20B:
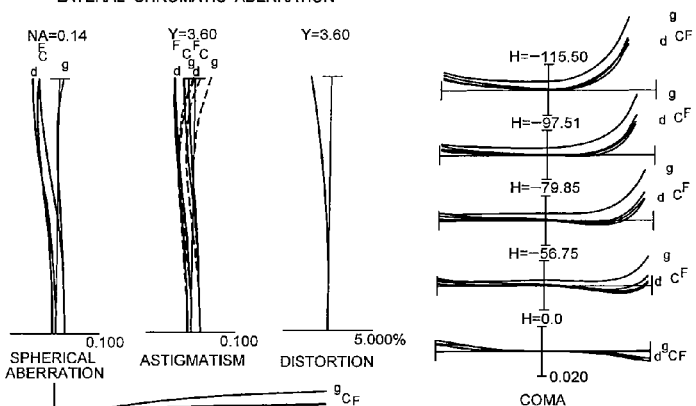
Figure 20C:
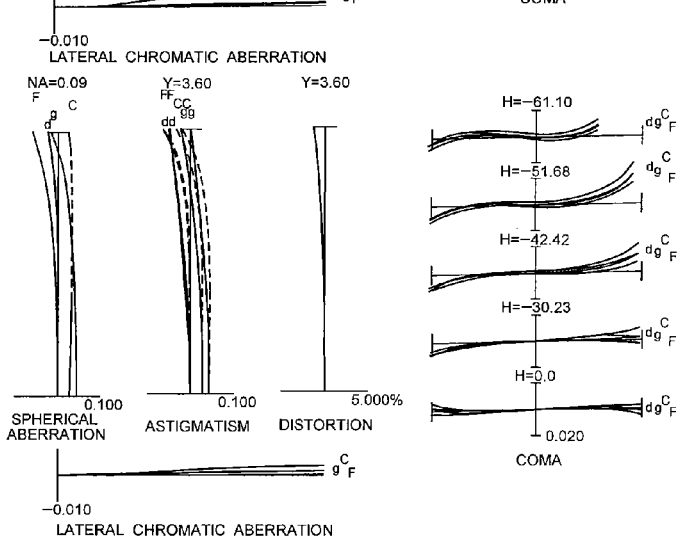

FIGS. 20A, 20B and 20C are graphs showing various aberrations of the zoom lens system according to Example 6 upon focusing on a close-rang object in which FIG. 20A is in a wide-angle end state, FIG. 20B is in an intermediate focal length state, and FIG. 20C is in a telephoto end state.

As is apparent from the respective graphs, the zoom lens system according to Example 6 shows superb optical performance as a result of good corrections to various aberrations in the wide-angle end state W, in the intermediate focal length state M, and in the telephoto end state T over entire image-taking range from infinity to a close-rang object.

EXAMPLE 7

FIG. 21 is a diagram showing a lens configuration of a zoom lens system according to Example 7 together with a zooming trajectory of each lens group.

In FIG. 21, a zoom lens system according to Example 7 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 7 are listed in Table 7.

TABLE 7

[Specifications]

|   | W | T |
|---|---|---|
| f = | 4.81 | 16.50 |
| FNO = | 2.86 | 5.60 |
| 2ω = | 77.3° | 24.6° |
| Ymax = | 3.60 | |

[Lens Data]

|  | r | d | nd | νd |
|---|---|---|---|---|
| 1) | 62.0000 | 1.1000 | 42.71 | 1.820800 |
| *2) | 4.7815 | 2.6500 | | |
| *3) | 11.2971 | 1.7500 | 21.15 | 1.906800 |
| 4) | 29.0165 | (d4) | | |
| 5) | ∞ | 0.4000 | Aperture Stop S | |
| *6) | 6.4216 | 1.6000 | 53.22 | 1.693500 |
| 7) | −5052.7279 | 0.2000 | | |
| 8) | 6.7233 | 1.7000 | 52.29 | 1.755000 |
| 9) | −22.5427 | 0.6000 | 31.31 | 1.903660 |
| 10) | 4.0622 | 0.8500 | | |
| 11) | 29.5119 | 1.3000 | 70.45 | 1.487490 |
| 12) | −14.2888 | (d12) | | |
| *13) | 12.2074 | 1.7000 | 82.56 | 1.497820 |
| 14) | −447.5037 | (d14) | | |
| 15) | ∞ | 0.5000 | 64.12 | 1.516800 |
| 16) | ∞ | (Bf) | | |

[Aspherical Data]

Surface Number: 2 k = 0.1500
C4 = 1.50380E−04
C6 = 7.21470E−06
C8 = −2.32690E−07
C10 = 3.94910E−09

Surface Number: 3 k = 1.9750
C4 = −4.71500E−05
C6 = 0.00000E+00
C8 = 0.00000E+00
C10 = 0.00000E+00

Surface Number: 6 k = 0.5262

TABLE 7-continued

C4 = −6.14980E−05
C6 = 0.00000E+00
C8 = 0.00000E+00
C10 = 0.00000E+00
Surface Number: 13 k = 2.3783
C4 = −1.09510E−04
C6 = 0.00000E+00
C8 = 0.00000E+00
C10 = 0.00000E+00

[Variable Distances]

|     | W       | M       | T       |
|-----|---------|---------|---------|
|     | (Focusing on infinity) | | |
| f   | 4.81    | 8.80    | 16.50   |
| D0  | ∞       | ∞       | ∞       |
| d4  | 15.97893| 7.00128 | 1.95069 |
| d12 | 4.58818 | 9.56564 | 19.17128|
| d14 | 3.29380 | 3.29380 | 3.29380 |
|     | (Focusing on a close-rang object: 300 mm) | | |
| β   | −0.01790| −0.03207| −0.05863|
| D0  | 261.2641| 265.2643| 260.7093|
| d4  | 15.97893| 7.00128 | 1.95069 |
| d12 | 4.37210 | 8.88339 | 17.06822|
| d14 | 3.50988 | 3.97605 | 5.39686 |

[Values for Conditional Expressions]

(1): ft × Ymax/{fw × (fw + ft) } = 0.57951
(2): | f1 | /(fw × ft)$^{1/2}$ = 1.25720
(3): fw/TL = 0.12242
(4): (Rb + Ra)/(Rb − Ra) = 0.94689
(5): ν31 = 82.56
(6): fL11/f1 = 0.56852
(7): n23 − n24 = 0.41617
(8): ν23 = 31.31
(9): Rc/Rd = 0.95513

Figure 22A:
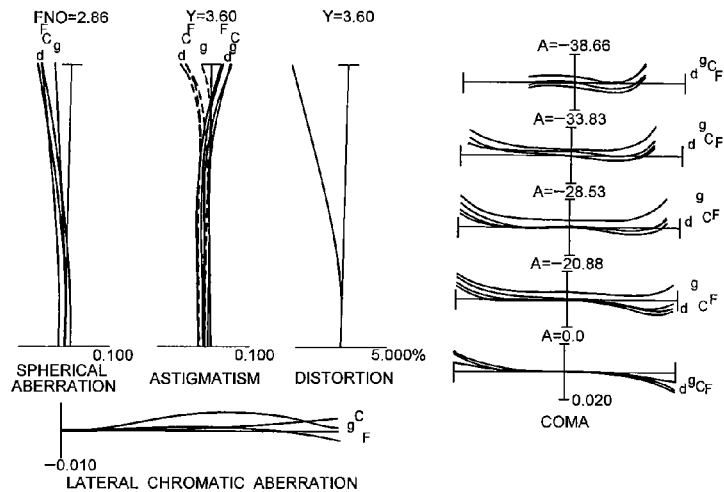
Figure 22B:
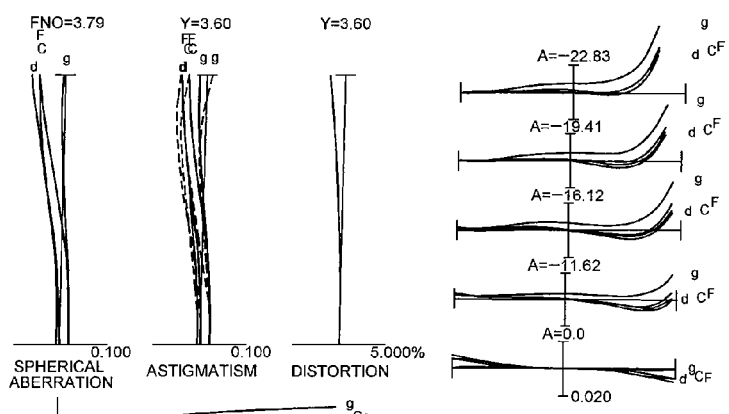
Figure 22C:
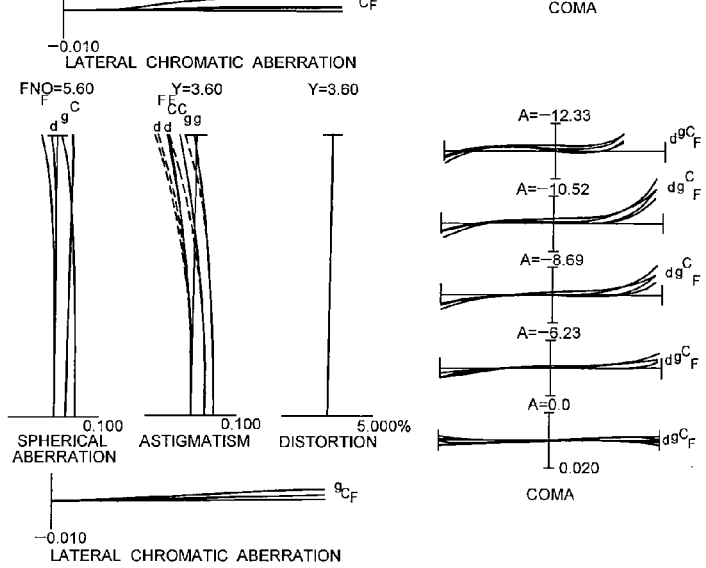

FIGS. 22A, 22B and 22C are graphs showing various aberrations of the zoom lens system according to Example 7 upon focusing on infinity in which FIG. 22A is in a wide-angle end state, FIG. 22B is in an intermediate focal length state, and FIG. 22C is in a telephoto end state.

Figure 23A:
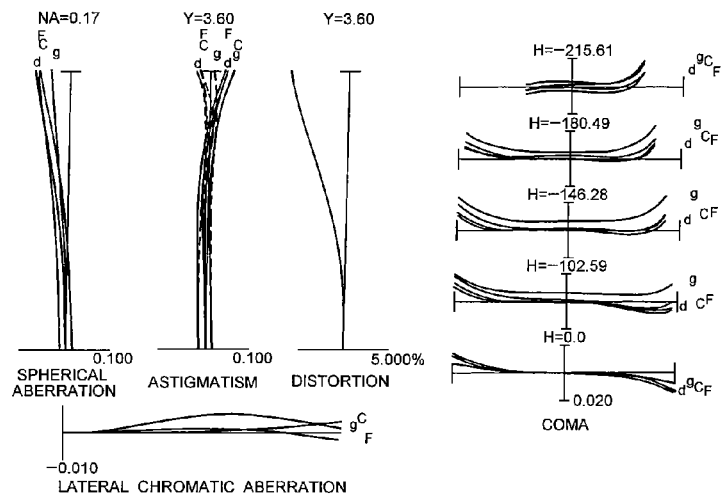
Figure 23B:
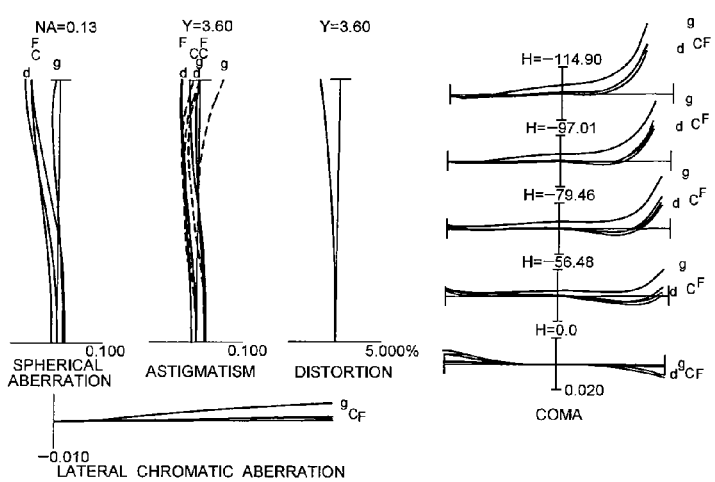
Figure 23C:
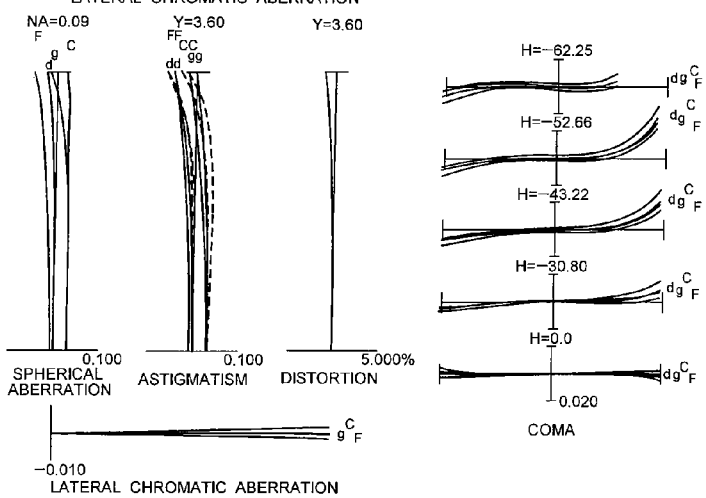

FIGS. 23A, 23B and 23C are graphs showing various aberrations of the zoom lens system according to Example 7 upon focusing on a close-rang object in which FIG. 23A is in a wide-angle end state, FIG. 23B is in an intermediate focal length state, and FIG. 23C is in a telephoto end state.

As is apparent from the respective graphs, the zoom lens system according to Example 7 shows superb optical performance as a result of good corrections to various aberrations in the wide-angle end state W, in the intermediate focal length state M, and in the telephoto end state T over entire image-taking range from infinity to a close-rang object.

EXAMPLE 8

FIG. 24 is a diagram showing a lens configuration of a zoom lens system according to Example 8 together with a zooming trajectory of each lens group.

In FIG. 24, a zoom lens system according to Example 8 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 8 are listed in Table 8.

TABLE 8

[Specifications]

|        | W     | T     |
|--------|-------|-------|
| f =    | 4.81  | 16.50 |
| FNO =  | 2.85  | 5.57  |
| 2ω =   | 77.4° | 24.6° |
| Ymax = | 3.60  |       |

[Lens Data]

|      | r        | d      | nd    | νd      |
|------|----------|--------|-------|---------|
| 1)   | 61.3209  | 1.1000 | 42.71 | 1.820800|
| *2)  | 4.8836   | 2.6500 |       |         |
| *3)  | 11.6093  | 1.7500 | 21.15 | 1.906800|
| 4)   | 28.8813  | (d4)   |       |         |
| 5)   | ∞        | 0.4000 | Aperture Stop S | |
| *6)  | 5.6241   | 1.7500 | 49.23 | 1.768020|
| 7)   | −208.7299| 0.3500 |       |         |
| 8)   | 14.0210  | 1.5500 | 52.29 | 1.755000|
| 9)   | −10.7163 | 0.6000 | 31.31 | 1.903660|
| 10)  | 4.2526   | 0.7000 |       |         |
| 11)  | 10.3293  | 1.3000 | 53.71 | 1.579570|
| 12)  | −22.9794 | (d12)  |       |         |
| *13) | 13.5832  | 1.7000 | 82.56 | 1.497820|
| 14)  | −91.9040 | (d14)  |       |         |
| 15)  | ∞        | 0.5000 | 64.12 | 1.516800|
| 16)  | ∞        | (Bf)   |       |         |

[Aspherical Data]

Surface Number: 2 k = 0.1500
C4 = 2.30560E−04
C6 = 6.08290E−06

TABLE 8-continued

C8 = −2.21690E−07
C10 = 2.80080E−09
Surface Number: 3 k = 1.6183
C4 = 3.46320E−05
C6 = 0.00000E+00
C8 = 0.00000E+00
C10 = 0.00000E+00
Surface Number: 6 k = 0.4922
C4 = −5.74690E−05
C6 = 0.00000E+00
C8 = 0.00000E+00
C10 = 0.00000E+00
Surface Number: 13 k = 2.9326
C4 = −1.26780E−04
C6 = 0.00000E+00
C8 = 0.00000E+00
C10 = 0.00000E+00

[Variable Distances]

|   | W | M | T |
|---|---|---|---|
| (Focusing on infinity) | | | |
| f | 4.81 | 8.80 | 16.50 |
| D0 | ∞ | ∞ | ∞ |
| d4 | 15.99238 | 7.01473 | 1.96414 |
| d12 | 4.57204 | 9.54950 | 19.15514 |
| d14 | 3.40584 | 3.40584 | 3.40584 |
| (Focusing on a close-rang object: 300 mm) | | | |
| β | −0.01790 | −0.03207 | −0.05864 |
| D0 | 261.1547 | 265.1550 | 260.5999 |
| d4 | 15.99238 | 7.01473 | 1.96414 |
| d12 | 4.35593 | 8.86717 | 17.05184 |
| d14 | 3.62195 | 4.08818 | 5.50914 |

[Values for Conditional Expressions]

(1): ft × Ymax/{fw × (fw + ft)} = 0.57951
(2): | f1 |/(fw × ft)$^{1/2}$ = 1.25720
(3): fw/TL = 0.12208
(4): (Rb + Ra)/(Rb − Ra) = 0.74247
(5): v31 = 82.56
(6): fL11/f1 = 0.58231
(7): n23 − n24 = 0.32409
(8): v23 = 31.31
(9): Rc/Rd = 0.40112

Figure 25A:
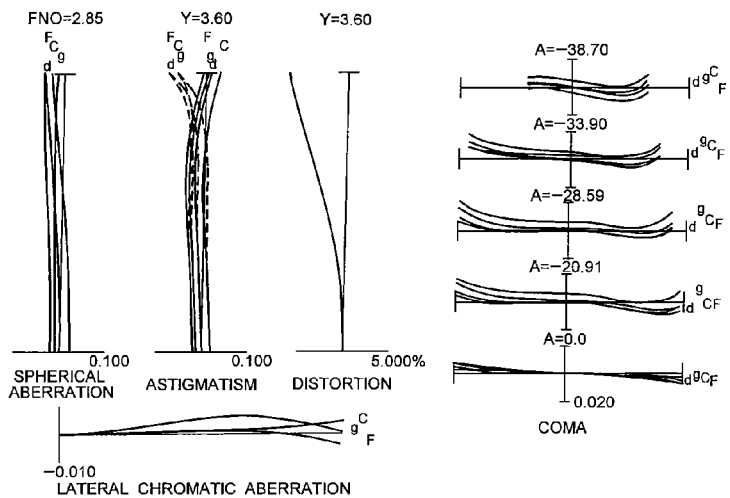
Figure 25B:
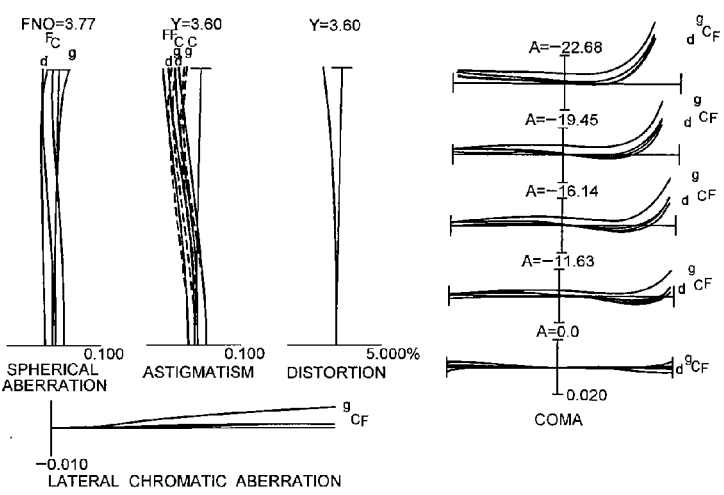
Figure 25C:
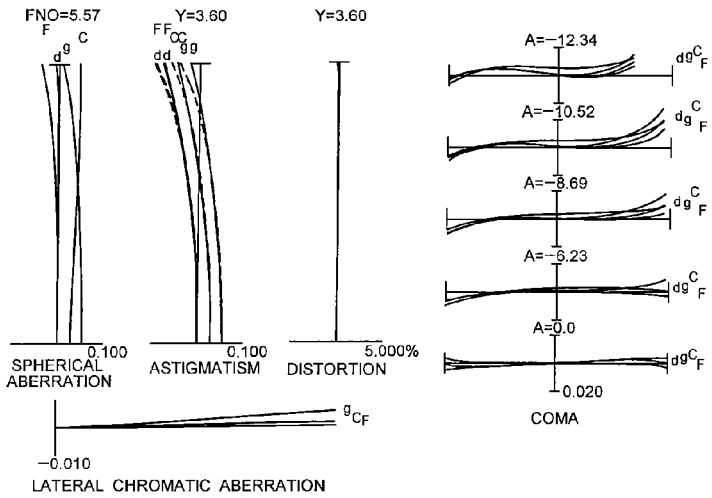

FIGS. 25A, 25B and 25C are graphs showing various aberrations of the zoom lens system according to Example 8 upon focusing on infinity in which FIG. 25A is in a wide-angle end state, FIG. 25B is in an intermediate focal length state, and FIG. 25C is in a telephoto end state.

Figure 26A:
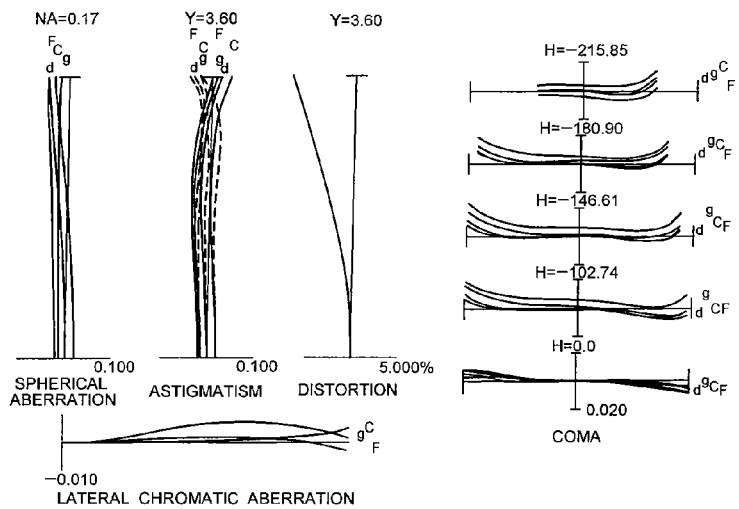
Figure 26B:
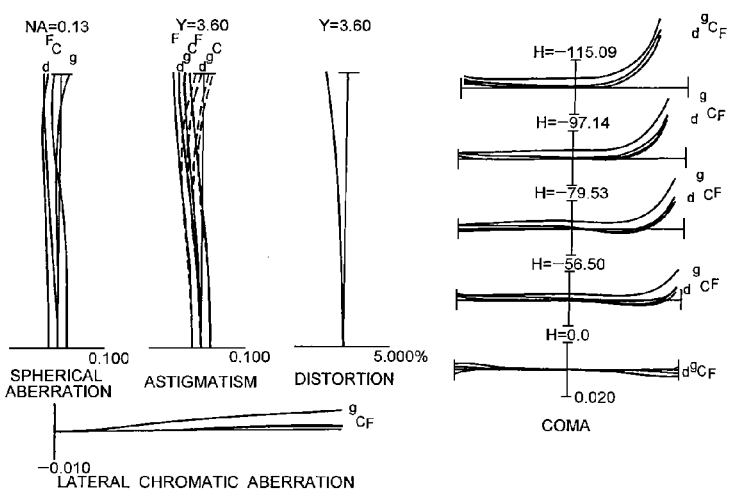
Figure 26C:
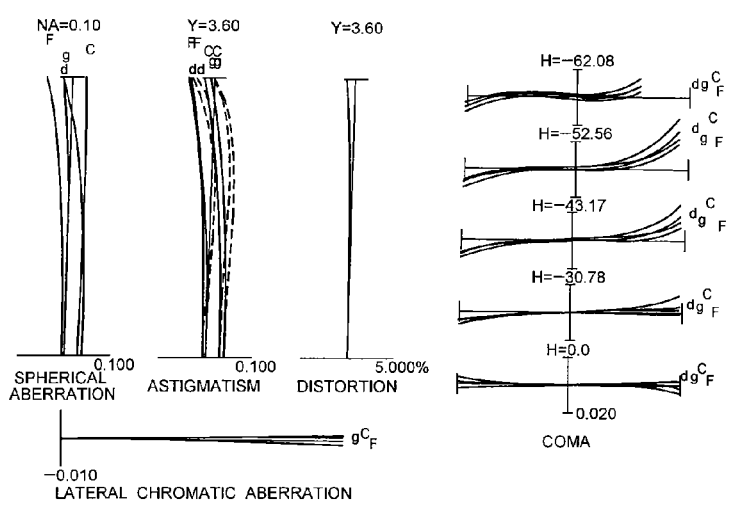

FIGS. 26A, 26B and 26C are graphs showing various aberrations of the zoom lens system according to Example 8 upon focusing on a close-rang object in which FIG. 26A is in a wide-angle end state, FIG. 26B is in an intermediate focal length state, and FIG. 26C is in a telephoto end state.

As is apparent from the respective graphs, the zoom lens system according to Example 8 shows superb optical performance as a result of good corrections to various aberrations in the wide-angle end state W, in the intermediate focal length state M, and in the telephoto end state T over entire image-taking range from infinity to a close-rang object.

EXAMPLE 9

FIG. 27 is a diagram showing a lens configuration of a zoom lens system according to Example 9 together with a zooming trajectory of each lens group.

In FIG. 27, a zoom lens system according to Example 9 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 is an aspherical surface.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 9 are listed in Table 9.

TABLE 9

[Specifications]

|   | W | T |
|---|---|---|
| f = | 4.81 | 16.50 |
| FNO = | 2.89 | 5.64 |
| 2ω = | 77.3° | 24.7° |
| Ymax = | 3.60 | |

[Lens Data]

|   | r | d | nd | vd |
|---|---|---|---|---|
| 1) | 40.6181 | 1.1000 | 42.71 | 1.820800 |
| *2) | 4.8246 | 2.9000 | | |
| 3) | 9.6817 | 1.7500 | 20.88 | 1.922860 |
| 4) | 17.2370 | (d4) | | |
| 5) | ∞ | 0.4000 | Aperture Stop S | |
| *6) | 6.4947 | 1.6000 | 49.23 | 1.768020 |
| 7) | −87.5174 | 0.3000 | | |
| 8) | 9.5880 | 1.7500 | 52.29 | 1.755000 |
| 9) | −11.6669 | 0.6000 | 31.31 | 1.903660 |
| 10) | 4.5530 | 0.8000 | | |
| 11) | 66.4390 | 1.3000 | 70.45 | 1.487490 |

TABLE 9-continued

| | | | | |
|---|---|---|---|---|
| 12) | −10.6099 | (d12) | | |
| *13) | 15.0725 | 1.7000 | 82.56 | 1.497820 |
| 14) | −54.3714 | (d14) | | |
| 15) | ∞ | 0.5000 | 64.12 | 1.516800 |
| 16) | ∞ | (Bf) | | |

[Aspherical Data]

Surface Number: 2

K = 0.1389
C4 = 2.38920E−04
C6 = 5.68320E−06
C8 = −1.35950E−07
C10 = 1.85430E−09

Surface Number: 6

K = 0.3488
C4 = −6.06680E−05
C6 = 0.00000E+00
C8 = 0.00000E+00
C10 = 0.00000E+00

Surface Number: 13

K = 2.8933
C4 = −4.12110E−05
C6 = 0.00000E+00
C8 = 0.00000E+00
C10 = 0.00000E+00

[Variable Distances]

| | W | M | T |
|---|---|---|---|
| (Focusing on infinity) | | | |
| f | 4.81 | 8.80 | 16.50 |
| D0 | ∞ | ∞ | ∞ |
| d4 | 16.00687 | 7.02922 | 1.97863 |
| d12 | 4.37324 | 9.35070 | 18.95634 |
| d14 | 3.50407 | 3.50407 | 3.50407 |
| (Focusing on a close-rang object: 300 mm) | | | |
| β | −0.01790 | −0.03208 | −0.0586 |
| D0 | 260.8908 | 264.8910 | 260.3360 |
| d4 | 16.00687 | 7.02922 | 1.97863 |
| d12 | 4.15709 | 8.66825 | 16.85272 |
| d14 | 3.72022 | 4.18652 | 5.60769 |

[Values for Conditional Expressions]

(1): ft × Ymax/{fw × (fw + ft)} = 0.57951
(2): | f1 |/(fw × ft)$^{1/2}$ = 1.25720
(3): fw/TL = 0.12127
(4): (Rb + Ra)/(Rb − Ra) = 0.56591
(5): ν31 = 82.56
(6): fL11/f1 = 0.60391
(7): n23 − n24 = 0.41617
(8): ν23 = 31.31
(9): Rc/Rd = 0.67738

Figure 28A:
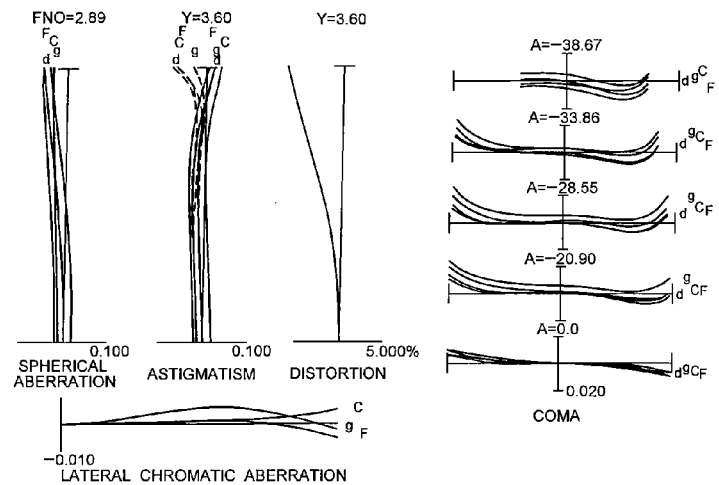
Figure 28B:
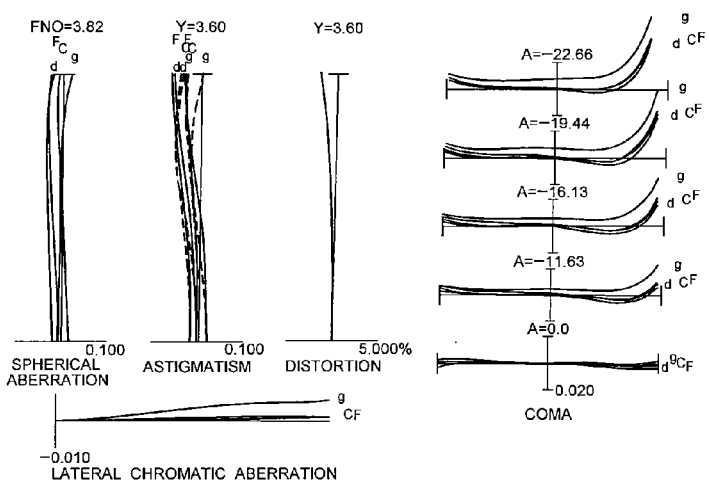
Figure 28C:
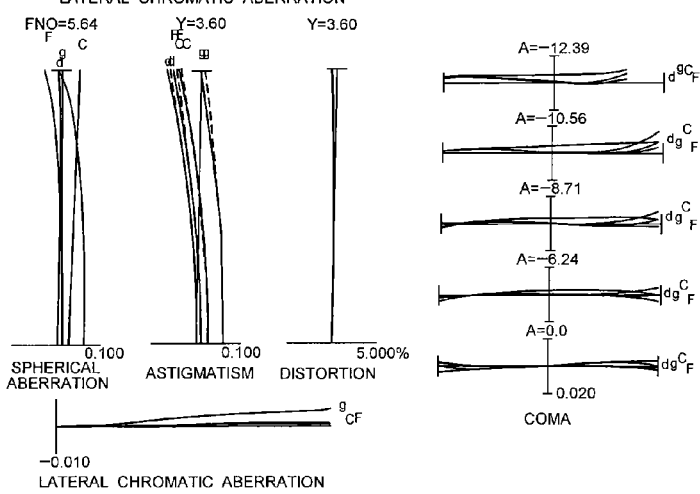

FIGS. 28A, 28B and 28C are graphs showing various aberrations of the zoom lens system according to Example 9 upon focusing on infinity in which FIG. 28A is in a wide-angle end state, FIG. 28B is in an intermediate focal length state, and FIG. 28C is in a telephoto end state.

Figure 29A:
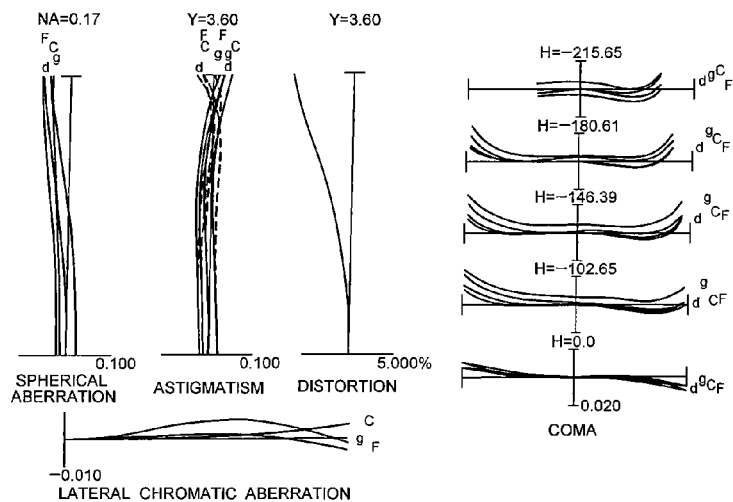
Figure 29B:
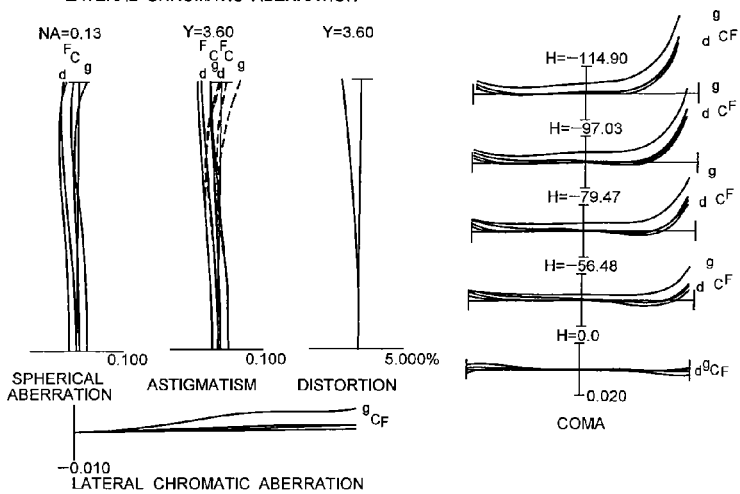
Figure 29C:
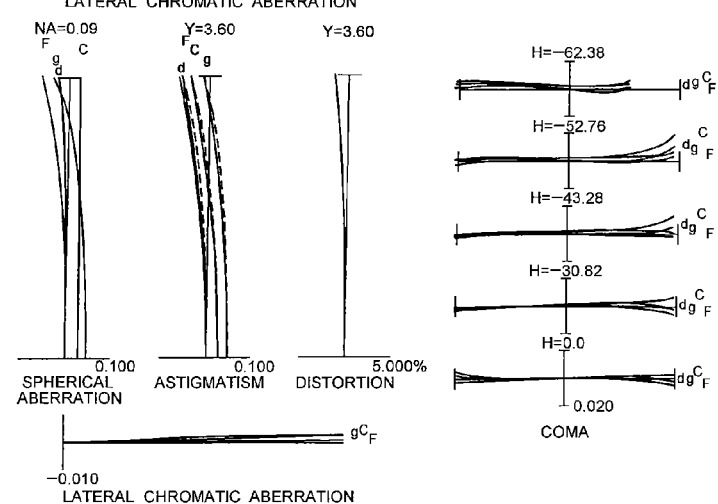

FIGS. 29A, 29B and 29C are graphs showing various aberrations of the zoom lens system according to Example 9 upon focusing on a close-rang object in which FIG. 29A is in a wide-rang end state, FIG. 29B is in an intermediate focal length state, and FIG. 29C is in a telephoto end state.

As is apparent from the respective graphs, the zoom lens system according to Example 9 shows superb optical performance as a result of good corrections to various aberrations in the wide-angle end state W, in the intermediate focal length state M, and in the telephoto end state T over entire image-taking range from infinity to a close-rang object.

EXAMPLE 10

FIG. 30 is a diagram showing a lens configuration of a zoom lens system according to Example 10 together with a zooming trajectory of each lens group.

In FIG. 30, a zoom lens system according to Example 10 includes, in order from an object along an optical axis, a first lens group G1 having negative refractive power, an aperture stop S, a second lens group G2 having positive refractive power, and a third lens group G3 having positive refractive power. Upon zooming from a wide-angle end state W to a telephoto end state T, the first lens group G1 and the second lens group G2 are moved and the third lens group G3 is fixed such that a distance between the first lens group G1 and the second lens group G2 decreases, and a distance between the second lens group G2 and the third lens group G3 increases.

The first lens group G1 is composed of, in order from the object along the optical axis, a negative meniscus lens L11 having a convex surface facing the object, and a positive lens L12 having a convex surface facing the object. The image plane I side lens surface of the negative meniscus lens L11 and the object side lens surface of the positive lens L12 are respective aspherical surfaces.

The second lens group G2 is composed of, in order from the object along the optical axis, a first positive lens L21, a second positive lens L22, a negative lens L23, and a third positive lens L24. The second positive lens L22 and the negative lens L23 are cemented with each other. The object side lens surface of the first positive lens L21 is an aspherical surface.

The third lens group G3 is composed of a single positive lens L31, and the object side lens surface of the positive lens L31 is an aspherical surface.

Focusing from infinity to a close-rang object is carried out by moving the third lens group G3 along the optical axis to the object.

An aperture stop S is disposed to the object side of the first positive lens L21, which is disposed to the most object side of the second lens group G2, and moved in a body with the second lens group G2 upon zooming from the wide-angle end state W to the telephoto end state T.

A filter group FL is composed of an infrared light blocking filter, and the like.

Various values associated with a zoom lens system according to Example 10 are listed in Table 10.

TABLE 10

[Specifications]

| | W | T |
|---|---|---|
| f = | 4.81 | 16.50 |
| FNO = | 2.80 | 5.59 |
| 2ω = | 77.4° | 24.7° |
| Ymax = | 3.60 | |

[Lens Data]

| | r | d | nd | νd |
|---|---|---|---|---|
| 1) | 57.5782 | 1.1000 | 42.71 | 1.820800 |
| *2) | 4.7785 | 2.6500 | | |
| *3) | 12.1094 | 1.7000 | 21.15 | 1.906800 |
| 4) | 32.2755 | (d4) | | |
| 5) | ∞ | 0.4000 | Aperture Stop S | |
| *6) | 5.6789 | 1.7000 | 49.23 | 1.768020 |

TABLE 10-continued

| | | | | |
|---|---|---|---|---|
| 7) | −117.1689 | 0.3000 | | |
| 8) | 9.6873 | 1.8000 | 40.77 | 1.883000 |
| 9) | −9.3920 | 0.6000 | 28.27 | 2.003300 |
| 10) | 3.8775 | 0.7000 | | |
| 11) | 10.4317 | 1.3000 | 42.72 | 1.567320 |
| 12) | −34.8046 | (d12) | | |
| *13) | 12.5560 | 1.7000 | 82.56 | 1.497820 |
| 14) | −84.8842 | (d14) | | |
| 15) | ∞ | 0.5000 | 64.12 | 1.516800 |
| 16) | ∞ | (Bf) | | |

[Aspherical Data]

Surface Number: 2

$k = 0.1674$
$C4 = 2.90530E{-}04$
$C6 = 6.54090E{-}06$
$C8 = -2.78430E{-}07$
$C10 = 3.97500E{-}09$

Surface Number: 2

$k = 1.8300$
$C4 = 5.45810E{-}05$
$C6 = 0.00000E{+}00$
$C8 = 0.00000E{+}00$
$C10 = 0.00000E{+}00$

Surface Number: 2

$k = 0.3959$
$C4 = -2.93110E{-}05$
$C6 = 0.00000E{+}00$
$C8 = 0.00000E{+}00$
$C10 = 0.00000E{+}00$

Surface Number: 13

$k = 2.6499$
$C4 = -8.77120E{-}05$
$C6 = 0.00000E{+}00$
$C8 = 0.00000E{+}00$
$C10 = 0.00000E{+}00$

[Variable Distances]

| | W | M | T |
|---|---|---|---|
| (Focusing on infinity) | | | |
| f | 4.81 | 8.80 | 16.50 |
| D0 | ∞ | ∞ | ∞ |
| d4 | 14.91488 | 6.55397 | 1.85035 |
| d12 | 4.42222 | 9.01111 | 17.86686 |
| d14 | 2.50550 | 2.50550 | 2.50550 |
| (Focusing on a close-rang object: 300 mm) | | | |
| β | −0.01776 | −0.03176 | −0.05759 |
| D0 | 263.2098 | 266.9819 | 262.8297 |
| d4 | 14.91488 | 6.55397 | 1.85035 |
| d12 | 4.18613 | 8.27571 | 15.67275 |
| D14 | 2.74159 | 3.24090 | 4.69961 |

[Values for Conditional Expressions]

Figure 31A:
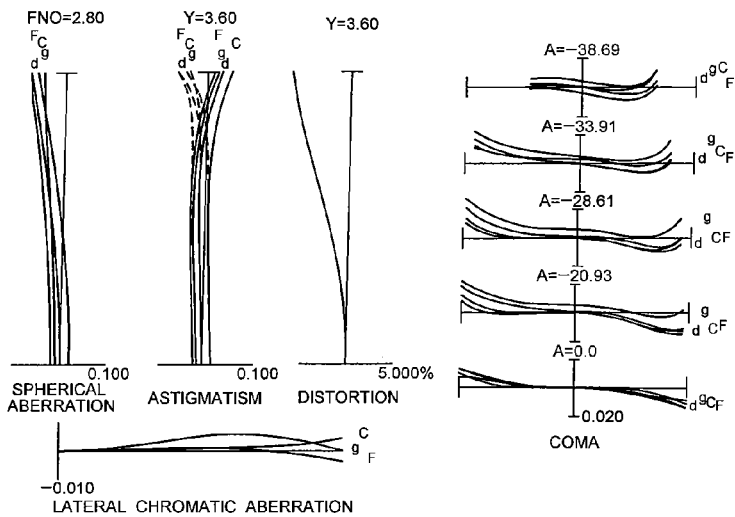
Figure 31B:
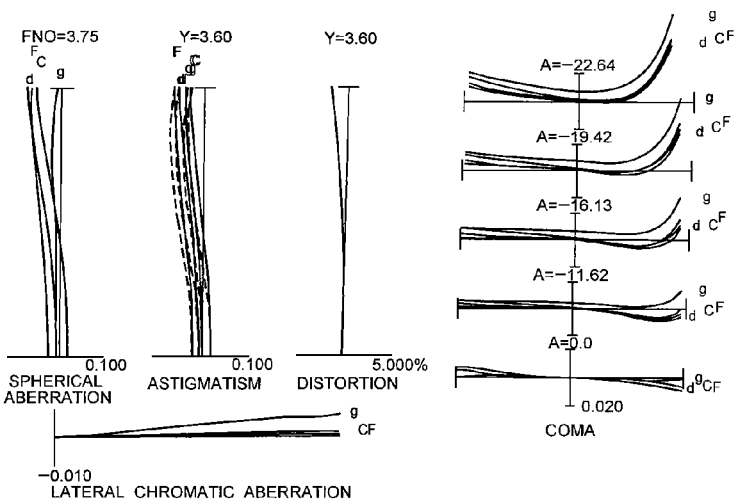
Figure 31C:
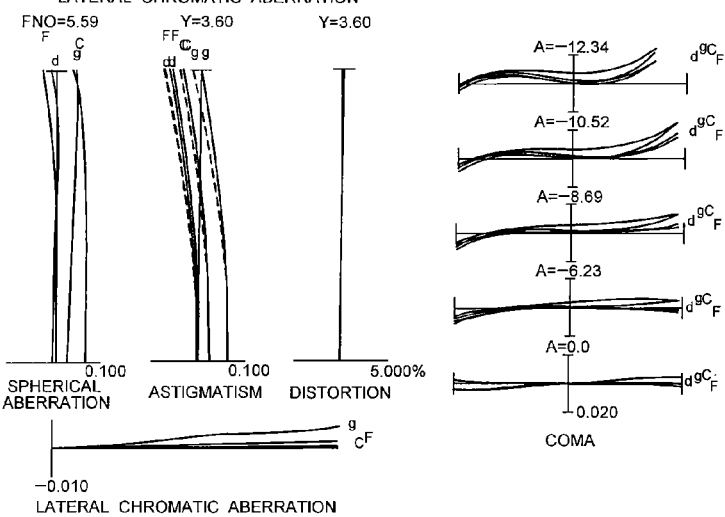

(1): $ft \times Ymax/\{fw \times (fw + ft)\} = 0.57951$
(2): $|f1|/(fw \times ft)^{1/2} = 1.22577$
(3): $fw/TL = 0.12940$
(4): $(Rb + Ra)/(Rb - Ra) = 0.74228$
(5): $v31 = 82.56$
(6): $fL11/f1 = 0.586892$
(7): $n23 - n24 = 0.43598$
(8): $v23 = 28.27$
(9): $Rc/Rd = 0.58622$ FIGS. 31A, 31B and 31C are graphs showing various aberrations of the zoom lens system according to Example 10 upon focusing on infinity in which FIG. 31A is in a wide-angle end state, FIG. 31B is in an intermediate focal length state, and FIG. 31C is in a telephoto end state.

Figure 32A:
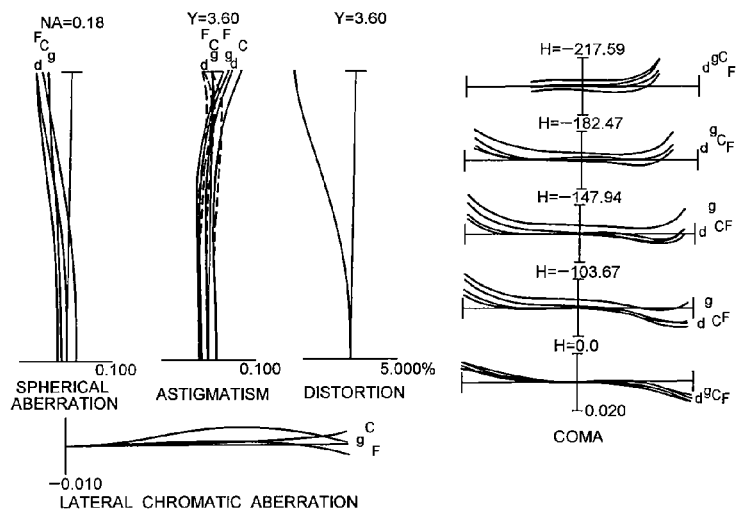
Figure 32B:
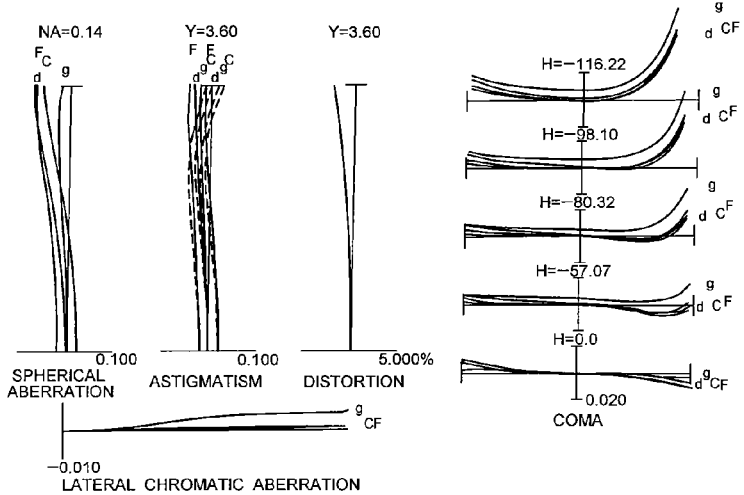
Figure 32C:
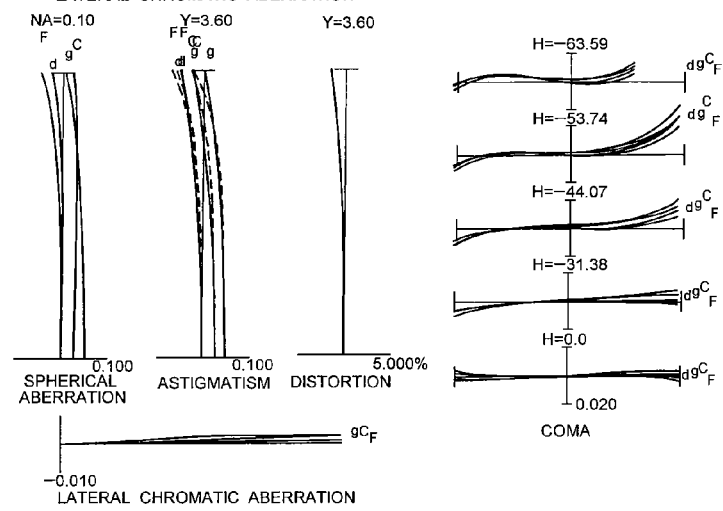

FIGS. 32A, 32B and 32C are graphs showing various aberrations of the zoom lens system according to Example 10 upon focusing on a close-rang object in which FIG. 32A is in a wide-angle end state, FIG. 32B is in an intermediate focal length state, and FIG. 32C is in a telephoto end state.

As is apparent from the respective graphs, the zoom lens system according to Example 10 shows superb optical performance as a result of good corrections to various aberrations in the wide-angle end state W, in the intermediate focal length state M, and in the telephoto end state T over entire image-taking range from infinity to a close-rang object.

As described above, the present application makes it possible to realize a zoom lens system having an angle of view of over 75 degrees in the wide-angle end state corresponding to a serious wide-angle shot, a high zoom ratio of about three to four, and high optical performance, being extremely compact as a whole, and suitable for a digital still camera and a video camera, and to realize an imaging apparatus using the zoom lens system, and a method for varying a focal length of the zoom lens system.

Incidentally, the following description may suitably be applied within limits that do not deteriorate optical performance.

In each Example, although a three-group configuration is shown, it can be applicable to a four-group configuration and a five-group configuration.

In each Example, in order to carry out focusing from infinity to a close-rang object, a portion of a lens group, a single lens group, or a plurality of lens groups may be moved along the optical axis. The focusing lens group(s) may be used for auto focus, and suitable for being driven by a motor such as an ultrasonic motor. In a zoom lens system according to each Example, it is preferable that the third lens group is used for the focusing lens group.

In a zoom lens system according to each Example, in order to correct an image blur caused by a camera shake, a portion of a lens group, or a single lens group may be moved as a vibration reduction lens group in a direction perpendicular to the optical axis. In a zoom lens system according to each Example of the present application, it is preferable that the second lens group is used for the vibration reduction lens group.

Moreover, any lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass surface.

In a zoom lens system according to each Example, an antireflection coating having high transmittance over a broad wavelength range may be applied to each lens surface to reduce flare or ghost images, so that high optical performance with a high contrast can be attained.

In order to easily understand the present invention, the explanation has been carried out with reference to components of the embodiment, it is needless to say that the present invention is not limited to this.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object along an optical axis:
   a first lens group having negative refractive power;
   a second lens group having positive refractive power; and
   a third lens group having positive refractive power;
   upon zooming from a wide-angle end state to a telephoto end state, at least the first lens group and the second lens group being moved such that a distance between the first lens group and the second lens group decreases, and a distance between the second lens group and the third lens group increases;
   the first lens group consisting of, in order from the object along the optical axis, a negative meniscus lens having a convex surface facing the object, and a positive lens;
   at least one surface of the negative meniscus lens being an aspherical surface;
   the second lens group consisting of, in order from the object along the optical axis, a first positive lens, a second positive lens, a negative lens, and a third positive lens;
   at least one surface of the first positive lens being an aspherical surface;
   the third lens group consisting of a single positive lens; and
   the following conditional expressions being satisfied:

$$0.50 < ft \times Ymax/\{fw \times (fw+ft)\} < 0.70$$

$$1.14 < |f1|/(fw \times ft)^{1/2} < 1.35$$

where Ymax denotes the maximum image height of the zoom lens system, fw denotes a focal length of the zoom lens system in the wideangle end state, ft denotes a focal length of the zoom lens system in the telephoto end state, and f1 denotes a focal length of the first lens group.

2. The zoom lens system according to claim 1, wherein an aperture stop is disposed between the first lens group and the second lens group.

3. The zoom lens system according to claim 1, wherein the following conditional expression is satisfied:

$$0.114 < fw/TL < 0.145$$

where TL denotes the maximum total lens length.

4. The zoom lens system according to claim 1, wherein focusing from infinity to a close-range object is carried out by moving the third lens group along the optical axis.

5. The zoom lens system according to claim 1, wherein the following conditional expression is satisfied:

$$-0.20 < (Rb+Ra)/(Rb-Ra) < 1.50$$

where Ra denotes a paraxial radius of curvature of the object side surface of the positive lens in the third lens group, and Rb denotes a paraxial radius of curvature of the image side surface of the positive lens in the third lens group.

6. The zoom lens system according to claim 1, wherein the following conditional expression is satisfied:

$$80.0 < v31 < 95.0$$

where v31 denotes Abbe number of a material of the positive lens in the third lens group at d-line, which has a wavelength $\lambda = 587.6$ nm.

7. The zoom lens system according to claim 1, wherein the following conditional expression is satisfied:

$$0.55 < fL11/f1 < 0.65$$

where fL11 denotes a focal length of the negative meniscus lens in the first lens group, and f1 denotes a focal length of the first lens group.

8. The zoom lens system according to claim 1, wherein the following conditional expressions are satisfied:

$$0.29 < n23 - n24 < 0.50$$

$$25.0 < v23$$

where n23 denotes refractive index of a material of the negative lens in the second lens group at d-line, which has a wavelength $\lambda = 587.6$ nm, n24 denotes refractive index of a material of the third positive lens in the second lens group at d-line, and v23 denotes Abbe number of a material of the negative lens in the second lens group at d-line.

9. The zoom lens system according to claim 1, wherein the second positive lens and the negative lens in the second lens group are cemented with each other, and the following conditional expression is satisfied:

$$0.30 < Rc/Rd < 1.10$$

where Rc denotes a paraxial radius of curvature of the object side surface of the first positive lens in the second lens group, and Rd denotes a paraxial radius of curvature of the object side surface of the second positive lens in the second lens group.

10. The zoom lens system according to claim 1, wherein at least one surface of the positive lens in the first lens group is an aspherical surface.

11. The zoom lens system according to claim 1, wherein at least one surface of the positive lens in the third lens group is an aspherical surface.

12. The zoom lens system according to claim 1, wherein the object side surface of the positive lens in the third lens group is an aspherical surface, and the aspherical surface has a shape that positive refractive power becomes stronger in the periphery of the lens than in the area near the optical axis.

13. The zoom lens system according to claim 1, wherein the third lens group is fixed upon zooming.

14. An optical apparatus equipped with the zoom lens system according to claim 1.

15. A method for forming an image of an object and varying a focal length of a zoom lens system that includes, in order from the object along an optical axis, a first lens group having negative refractive power, a second lens group having positive refractive power, and a third lens group having positive refractive power, the method comprising steps of:
   providing the first lens group that consists of, in order from the object along the optical axis, a negative meniscus lens having a convex surface facing the object, and a positive lens, at least one surface of the negative meniscus lens being an aspherical surface;
   providing the second lens group that consists of, in order from the object along the optical axis, a first positive lens, a second positive lens, a negative lens, and a third positive lens, at least one surface of the first positive lens being an aspherical surface;
   providing the third lens group that consists of a single positive lens;
   satisfying the following conditional expressions:

$$0.50 < ft \times Ymax/\{fw \times (fw+ft)\} < 0.70$$

$$1.14 < |f1|/(fw \times ft)^{1/2} < 1.35$$

where Ymax denotes the maximum image height of the zoom lens system, fw denotes a focal length of the zoom lens system in the wideangle end state, ft denotes a focal length of the zoom lens system in the telephoto end state, and f1 denotes a focal length of the first lens group; and varying the focal length of the zoom lens system from the wide-angle end state to the telephoto end state by moving at least the first lens group and the second lens group such that a distance between the first lens group and the second lens group decreases, and a distance between the second lens group and the third lens group increases.

16. The method according to claim 15, further comprising a step of:
satisfying the following conditional expression:

$$0.55 < fL11/f1 < 0.65$$

where fL11 denotes a focal length of the negative meniscus lens in the first lens group, and f1 denotes a focal length of the first lens group.

17. The method according to claim 15, further comprising a step of:
satisfying the following conditional expressions:

$$0.29 < n23-n24 < 0.50$$

$$25.0 < v23$$

where n23 denotes refractive index of a material of the negative lens in the second lens group at d-line, which has a wavelength λ=587.6 nm, n24 denotes refractive index of a material of the third positive lens in the second lens group at d-line, and v23 denotes Abbe number of a material of the negative lens in the second lens group at d-line.

18. A zoom lens system comprising, in order from an object along an optical axis:
a first lens group having negative refractive power;
a second lens group having positive refractive power; and
a third lens group having positive refractive power;
upon zooming from a wide-angle end state to a telephoto end state, at least the first lens group and the second lens group being moved such that a distance between the first lens group and the second lens group decreases, and a distance between the second lens group and the third lens group increases;
the first lens group comprising, in order from the object along the optical axis, a negative meniscus lens having a convex surface facing the object, and a positive lens;
at least one surface of the negative meniscus lens being an aspherical surface;
the second lens group comprising, in order from the object along the optical axis, a first positive lens, a second positive lens, a negative lens, and a third positive lens;
at least one surface of the first positive lens being an aspherical surface;
the third lens group comprising a single positive lens; and
the following conditional expressions being satisfied:

$$0.50 < ft \times Ymax/\{fw \times (fw+ft)\} < 0.70$$

$$1.14 < |f1|/(fw \times ft)^{1/2} < 1.35$$

where Ymax denotes the maximum image height of the zoom lens system, fw denotes a focal length of the zoom lens system in the wide-angle end state, ft denotes a focal length of the zoom lens system in the telephoto end state, and f1 denotes a focal length of the first lens group.

19. The zoom lens system according to claim 18, wherein the following conditional expression is satisfied:

$$0.114 < fw/FL < 0.145$$

where TL denotes the maximum total lens length.

20. The zoom lens system according to claim 18, wherein the following conditional expression is satisfied:

$$80.0 < v31 < 95.0$$

where v31 denotes Abbe number of a material of the positive lens in the third lens group at d-line, which has a wavelength λ=587.6 nm.

21. The zoom lens system according to claim 18, wherein the following conditional expression is satisfied:

$$0.55 < fL11/f1 < 0.65$$

where fL11 denotes a focal length of the negative meniscus lens in the first lens group, and f1 denotes a focal length of the first lens group.

22. The zoom lens system according to claim 18, wherein the following conditional expressions are satisfied:

$$0.29 < n23-n24 < 0.50$$

$$25.0 < v23$$

where n23 denotes refractive index of a material of the negative lens in the second lens group at d-line, which has a wavelength λ=587.6 nm, n24 denotes refractive index of a material of the third positive lens in the second lens group at d-line, and v23 denotes Abbe number of a material of the negative lens in the second lens group at d-line.

23. A method for forming an image of an object and varying a focal length of a zoom lens system that includes, in order from the object along an optical axis, a first lens group having negative refractive power, a second lens group having positive refractive power, and a third lens group having positive refractive power, the method comprising steps of:
providing the first lens group that comprises, in order from the object along the optical axis, a negative meniscus lens having a convex surface facing the object, and a positive lens, at least one surface of the negative meniscus lens being an aspherical surface;
providing the second lens group that comprises, in order from the object along the optical axis, a first positive lens, a second positive lens, a negative lens, and a third positive lens, at least one surface of the first positive lens being an aspherical surface;
providing the third lens group that comprises a single positive lens;
satisfying the following conditional expressions:

$$0.50 < ft \times Ymax/\{fw \times (fw+ft)\} < 0.70$$

$$1.14 < |f1|/(fw \times ft)^{1/2} < 1.35$$

where Ymax denotes the maximum image height of the zoom lens system, fw denotes a focal length of the zoom lens system in the wide-angle end state, ft denotes a focal length of the zoom lens system in the telephoto end state, and fi denotes a focal length of the first lens group; and
varying the focal length of the zoom lens system from the wide-angle end state to the telephoto end state by moving at least the first lens group and the second lens group such that a distance between the first lens group and the second lens group decreases, and a distance between the second lens group and the third lens group increases.

24. The method according to claim 23, further comprising a step of:
satisfying the following conditional expression:

$$0.55 < fL11/f1 < 0.65$$

where fL11 denotes a focal length of the negative meniscus lens in the first lens group, and f1 denotes a focal length of the first lens group.

25. The method according to claim 23, further comprising a step of:

satisfying the following conditional expressions:

$$0.29 < n23 - n24 < 0.50$$
$$25.0 < \nu23$$

where n23 denotes refractive index of a material of the negative lens in the second lens group at d-line, which has a wavelength $\lambda = 587.6$ nm, n24 denotes refractive index of a material of the third positive lens in the second lens group at d-line, and $\nu23$ denotes Abbe number of a material of the negative lens in the second lens group at d-line.

* * * * *